United States Patent
Haynes et al.

(10) Patent No.: US 10,859,278 B2
(45) Date of Patent: Dec. 8, 2020

(54) EVAPORATIVE COOLER WITH PRESSURIZED WATER DISTRIBUTION SYSTEM

(71) Applicant: Seeley International Pty Ltd, Lonsdale (AU)

(72) Inventors: Daniel Robert Haynes, Park Holme (AU); Finn Gascoigne Woodhouse, Hawthorndene (AU); Ian Howard Pendergrast, Woodcroft (AU); Lorinda Yvonne Abeyarathna, Black Forest (AU); Robert William Gilbert, Willunga (AU); Shane Antony Harris, Glenelg South (AU); Shoji Sinclair, Seacliff (AU)

(73) Assignee: Seeley International Pty Ltd, Lonsdale (AU)

( * ) Notice: Subject to any disclaimer, the term of this patent is extended or adjusted under 35 U.S.C. 154(b) by 0 days.

(21) Appl. No.: 16/119,099

(22) Filed: Aug. 31, 2018

(65) Prior Publication Data
US 2019/0063767 A1    Feb. 28, 2019

Related U.S. Application Data

(60) Provisional application No. 62/552,805, filed on Aug. 31, 2017.

(51) Int. Cl.
*F24F 6/04* (2006.01)

(52) U.S. Cl.
CPC .......... *F24F 6/04* (2013.01); *F24F 2006/046* (2013.01)

(58) Field of Classification Search
CPC .............. F24F 6/04; F24F 2006/046
(Continued)

(56) References Cited

U.S. PATENT DOCUMENTS

| 2,281,799 | A | * | 5/1942 | Quave | ............ G01N 1/10 |
| | | | | | 137/262 |
| 2,856,166 | A | | 10/1958 | Goettl | |

(Continued)

FOREIGN PATENT DOCUMENTS

| CN | 203605437 U | 5/2014 |
| WO | 2019043646 A1 | 3/2019 |

OTHER PUBLICATIONS

Written Opinion of the International Searching Authority (ISA/AU) for corresponding Application No. PCT/IB2018/056681, dated Nov. 5, 2018, consisting of 4 pages.

(Continued)

*Primary Examiner* — Charles S Bushey
(74) *Attorney, Agent, or Firm* — Katherine Koenig; Koenig IP Works, PLLC

(57) ABSTRACT

An evaporative cooler having a pressurized water distribution system that provides even water distribution to evaporative media pads within the evaporative cooler, even when the evaporative pads are canted and/or are not in perfect alignment. The pressurized water distribution system generally includes a distribution assembly with a pressurized flow path portion and a non-pressurized flow path portion, and a supply assembly. The evaporative cooler may also include other features that enhance aesthetics and/or cooling capacity, such as supplemental evaporative media pads, a perforated lid, an internal retaining frame, angled louvers, and/or a dropper that allows for a low-profile installation on a roof of a building or other structure.

19 Claims, 23 Drawing Sheets

(58) Field of Classification Search
USPC .......................................................... 261/106
See application file for complete search history.

(56) References Cited

U.S. PATENT DOCUMENTS

| | | | | |
|---|---|---|---|---|
| 3,738,621 | A | | 6/1973 | Anderson |
| 4,338,264 | A | * | 7/1982 | Seeley ...................... F24F 6/04 261/29 |
| 4,351,781 | A | * | 9/1982 | Blatter ...................... F24F 6/04 239/193 |
| 4,460,520 | A | * | 7/1984 | Wrightson ................ F28C 3/08 239/193 |
| 4,602,487 | A | * | 7/1986 | Seeley ...................... F24F 6/04 62/304 |
| 5,971,370 | A | | 10/1999 | Galabinski |
| 6,134,909 | A | | 10/2000 | Lyu |
| 6,332,332 | B1 | | 12/2001 | O'Brien |
| 6,450,485 | B1 | * | 9/2002 | Harrison ............... F24F 5/0035 261/106 |
| 6,669,119 | B1 | * | 12/2003 | Harrison ............... F24F 5/0035 239/193 |
| 7,232,076 | B2 | * | 6/2007 | Harrison ............... F24F 5/0035 239/1 |
| 2006/0070390 | A1 | | 4/2006 | Reinders |
| 2016/0116194 | A1 | | 4/2016 | Townsend |
| 2019/0186764 | A1 | * | 6/2019 | Haynes .................... F24F 6/04 |

OTHER PUBLICATIONS

International Search Report (PCT/ISA/210), dated May 18, 2020, issued by Australian Patent Office for PCT/AU2020/050169 (8 pages).

* cited by examiner

EVAPORATIVE COOLER WITH PRESSURIZED WATER DISTRIBUTION SYSTEM

TECHNICAL FIELD

This disclosure relates to an evaporative cooler having a pressurized water distribution system. This disclosure also relates to modifications for an evaporative cooler that are compatible with a pressurized water distribution system, including canted evaporative media pads, angled louvers for an evaporative media retention frame, a single-piece ventilated lid for the evaporative cooler that allows for vertical air intake, and dropper that facilitates installation of the evaporative cooler.

BACKGROUND

Evaporative coolers reduce the temperature of air through direct evaporative cooling. To achieve cooling, air is drawn through the sides of the housing of the evaporative cooler and over one or more wet evaporative media pads, thereby evaporating water within the evaporative media pads and reducing the temperature of the passing air.

In order to wet the evaporative media pads, evaporative coolers also include a water distribution system. Typically, water from a reservoir at the bottom of the evaporative cooler is drawn to the top of the evaporative cooler by a pump, from where the water is distributed by gravity through a limited number of distribution holes downward and into the evaporative media pads. Water that exits the evaporative media pads is collected within the reservoir and recirculated through the system by the pump. As the water is distributed by gravity, the evaporative media pads must be carefully installed, making sure the evaporative media pads are absolutely vertically aligned (at an angle of 0° from vertical) and horizontally aligned with each other. Any variation in height or angle of installation will reduce the efficiency of the evaporative cooler.

FIG. 1 shows a currently known evaporative cooler 10 in more detail. The currently known evaporative cooler 10 generally includes a housing 12 with a plurality of sides 14 (for example, four sides 14), a lid 16, and a reservoir 18, a retaining frame 20, at least one evaporative media pad 22 within the retaining frame 20, and a gravity distribution element 24 of a water distribution system that is located beneath the lid 16 and above the evaporative media pad(s) 22. The gravity distribution element 24 includes a water channel 26 in fluid communication with one or more outlets 28 from where the water is released to flow downward onto the evaporative media pad(s) 22. The water channel 26 is typically slanted downward to enhance distribution of the water by gravity. In most currently known evaporative coolers 10, water is gravity fed to the water channel 26 through only four distribution points. As discussed above, the retaining frame 20 is configured to retain the evaporative media pad(s) 22 in a vertical position (that is, in a position that is parallel to, or at an angle of 0°) relative to the direction of gravitational flow of water from the gravity distribution element 24. Any variation of this configuration may adversely affect the efficiency of the currently known evaporative cooler 10. Further, the retaining frame 20 is affixed to or integrated with the inner surfaces of the sides 14 of the housing 12, thereby positing the evaporative media pad(s) 22 immediately adjacent to the sides 14 of the housing 12.

Currently known evaporative coolers 10 also include a header block 30 immediately above, and typically in contact with, the evaporative media pad(s) 22 and a 20 mm gap 32 between the gravity distribution element 24 and the header block 30. The gap 32 is required by the design of currently known evaporative coolers 10 to provide clearance for the retaining frame 20 when the currently known evaporative cooler 10 is assembled. The header block 30 is used to prevent air bypass and diffuse water that clumps together as falls the 20-mm distance between the gravity distribution element 24 and the header block 30. The gravity distribution element 24 has a height of approximately 124 mm and the header block 30 has a height of approximately 30 mm. Thus, the total height required in currently known evaporative coolers 10 to supply water to the evaporative media pad(s) 22 is approximately 174 mm, which can affect the aesthetics of the design and/or limit the locations in which the evaporative cooler may be used.

Additionally, as noted above, the evaporative media pad(s) 22 in currently known evaporative coolers 10 are mounted or positioned immediately adjacent to the inner surfaces of the sides 14 of the housing 12, due to the configuration of the retaining frame 20. Not only does this configuration reduce airflow through and around the evaporative media pad(s) 22, but it also complicates manufacture and assembly of the housing. As a further result of this configuration, the evaporative media pad(s) 22 do not extend below the sides 14 of the housing 12 down into the reservoir 18, where the evaporative media pad(s) 22 would be in contact with the water within the reservoir 18. Even if a portion of the evaporative media pad(s) 22 did extend below the sides 14 of the housing 12, the lack of airflow holes in the reservoir 18 of the housing 12 means that such a portion of the evaporative media pad 22 would not be exposed to airflow, since the evaporative media pad(s) 22 are attached directly to the housing 12. Thus, this gap 34 between the bottom of the evaporative media pad(s) 22 and the bottom of the reservoir 18 represents wasted space that produces no cooling effect. FIG. 20 shows the gap 34 between a mounted evaporative media pad 22 and the bottom of the reservoir 18 in a currently known evaporative cooler 10.

Further, as shown in FIGS. 27 and 28, currently known evaporative coolers 10 are mounted a distance from the roof 36 or surface of the building or structure, exposing the roof jack, ductwork, and/or dropper 38. Such mounting is required for currently known evaporative coolers 10, as the evaporative media pad(s) 22 must be in a vertical position relative to the direction of gravitational flow of water from the gravity distribution element 24. To achieve even distribution of water onto the evaporative media pad(s) 22, the currently known evaporative cooler 10 must be mounted such that the lid 16 is horizontal. Although some currently known evaporative coolers 10 include an angled reservoir 18 that comes closer to matching the contour of the roof 36, they still have an angular/boxy appearance and exposed ductwork and/or dropper 38. Additionally, electrical and plumbing conduits 40 to the currently known evaporative coolers 10 run on the outside of the roof 36, which is unattractive and exposes the conduits 40 to weather and damage.

SUMMARY

Some embodiments advantageously provide an evaporative cooler having a pressurized water distribution system that provides even water distribution to evaporative media pads within the evaporative cooler, even when the evaporative pads are canted and/or are not in perfect alignment. In one embodiment, a pressurized water distribution system for an evaporative cooler includes: a pressurized flow path portion including at least one pressurized water channel, a plurality of outlet holes, and at least one inlet hole; and a non-pressurized flow path portion including at least one non-pressurized flow path in fluid communication with at least one of the plurality of outlet holes.

In one aspect of the embodiment, the pressurized water distribution system for an evaporative cooler further includes a plurality of gravity distribution elements, each of the plurality of gravity distribution elements defining the at least one non-pressurized flow path.

In one aspect of the embodiment, each of the plurality of gravity distribution elements includes at least one distribution feature, each of the at least one distribution feature being configured to progressively divide an amount of water flowing therethrough into an increasing number of non-pressurized flow paths.

In one aspect of the embodiment, each of the plurality of gravity distribution elements is configured to be directly adjacent to a corresponding one of a plurality of evaporative media pads.

In one aspect of the embodiment, the pressurized water distribution system for an evaporative cooler further includes a water distribution system lid, the water distribution system lid at least partially defining the at least one pressurized water channel, a plurality of outlet holes, and at least one inlet hole.

In one aspect of the embodiment, the pressurized water distribution system for an evaporative cooler further includes a manifold cover enclosing the at least one pressurized water channel, the manifold cover being removably coupled to the water distribution system lid.

In one aspect of the embodiment, the water distribution system lid includes: a first edge; a second edge opposite the first edge; a third edge between the first and second edges; and a fourth edge opposite the third edge and between the first and second edges, the water distribution system lid defining a plurality of outlet holes proximate each of the first, second, third, and fourth edges.

In one aspect of the embodiment, the at least one pressurized water channel includes a first pressurized water channel and a second pressurized water channel.

In one aspect of the embodiment, the first pressurized water channel is in fluid communication with the plurality of outlet holes proximate the first edge, a first half of the plurality of outlet holes proximate the third edge, and a first half of the plurality of outlet holes proximate the fourth edge; and the second pressurized water channel is in fluid communication with the plurality of outlet holes proximate the second edge, a second half of the plurality of outlet holes proximate the third edge, and a second half of the plurality of outlet holes of the fourth edge.

In one aspect of the embodiment, the at least one pressurized water channel includes a plurality of pressurized water channels, each of the plurality of pressurized water channels being in fluid communication with a corresponding one of the plurality of outlet holes, the water distribution system lid defining a plurality of non-pressurized gravity distribution water channels.

In one aspect of the embodiment, the plurality of non-pressurized gravity distribution water channels includes a plurality of water distribution channels extending from and being in fluid communication with a corresponding one of the plurality of outlet holes.

In one aspect of the embodiment, the water distribution system lid further includes a plurality of raised areas, each of the plurality of raised areas surrounding a corresponding one of the plurality of outlet holes.

In one aspect of the embodiment, the water distribution system lid further includes a plurality of caps, each of the plurality of caps configured to at least partially cover a corresponding raised area and being configured to direct a flow of water flowing through the corresponding one of the plurality of outlet holes.

In one aspect of the embodiment, the water distribution system lid defines a center aperture.

In one aspect of the embodiment, the water distribution system lid includes a first side, a second side opposite the first side, a third side between the first and second sides, and a fourth side opposite the third side and between the first and second sides, the first, second, third, and fourth sides surrounding the center aperture.

In one aspect of the embodiment, each of the first and second sides include a first plurality of outlet holes; and each of the third and fourth sides includes a second plurality of outlet holes, the second plurality being less than the first plurality.

In one aspect of the embodiment, each of the first, second, third, and fourth sides is configured to be directly adjacent to a corresponding one of a plurality of evaporative media pads.

In one embodiment, an evaporative cooler includes: a pressurized water distribution system including: a water distribution system lid including a first pressurized water channel and a second pressurized water channel, each of the first and second pressurized water channels having a plurality of outlet holes and at least one inlet hole; a first manifold cover configured to enclose the first pressurized water channel and a second manifold cover configured to enclose the second pressurized water channel with the plurality of outlet holes and the at least one inlet hole of each of the first and second pressurized water channels remaining unobstructed; and a plurality of gravity distribution elements, each of the plurality of gravity distribution elements defining a plurality of non-pressurized flow paths that are in fluid communication with the first and second pressurized channels, each of the gravity distribution elements including a plurality of distribution features that are configured to progressively divide an amount of water flowing therethrough into an increasing number of non-pressurized flow paths; a plurality of evaporative media pads, each of the plurality of evaporative media pads being directly adjacent to a corresponding one of the plurality of gravity distribution elements; and a pump including a first outlet in fluid communication with the first pressurized water channel and a second outlet in fluid communication with the second pressurized water channel.

In one embodiment, an evaporative cooler includes: a pressurized water distribution system including a water distribution system lid including a center aperture, a plurality of outlet holes around the center aperture, a plurality of pressurized water channels in fluid communication with the plurality of outlet holes, and at least one inlet hole in fluid communication with the plurality of pressurized water channels, each of the plurality of outlet holes including a raised area and a cap, the cap being removably coupled to the water distribution system lid, each of the raised areas defining a plurality of non-pressurized gravity distribution water channels in fluid communication with a corresponding one of the plurality of outlet holes; and a plurality of evaporative media pads, each of the plurality of evaporative media pads being directly adjacent to the water distribution system lid and in fluid communication with a corresponding one of the plurality of non-pressurized gravity distribution water channels.

In one aspect of the embodiment, the water distribution system lid includes a first side, a second side opposite the first side, a third side between the first and second sides, and a fourth side opposite the third side and between the first and second sides, the first, second, third, and fourth sides together defining the center aperture, each of the first and second sides including a first plurality of outlet holes and each of the third and fourth sides including a second plurality of outlet holes that is less than the first plurality.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
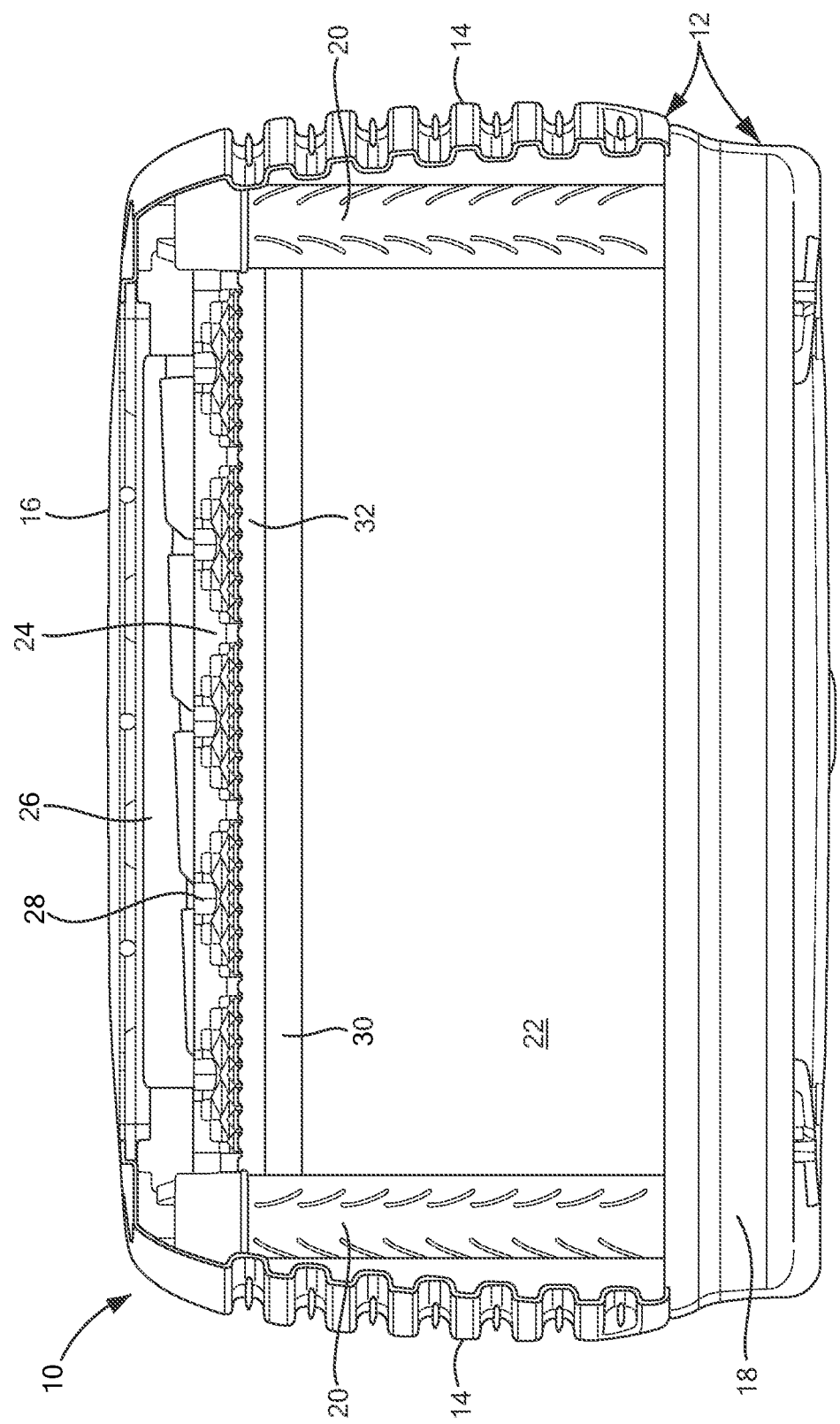
FIG. 1 shows a cross-sectional view of an evaporative cooler of the prior art.
Figure 2:
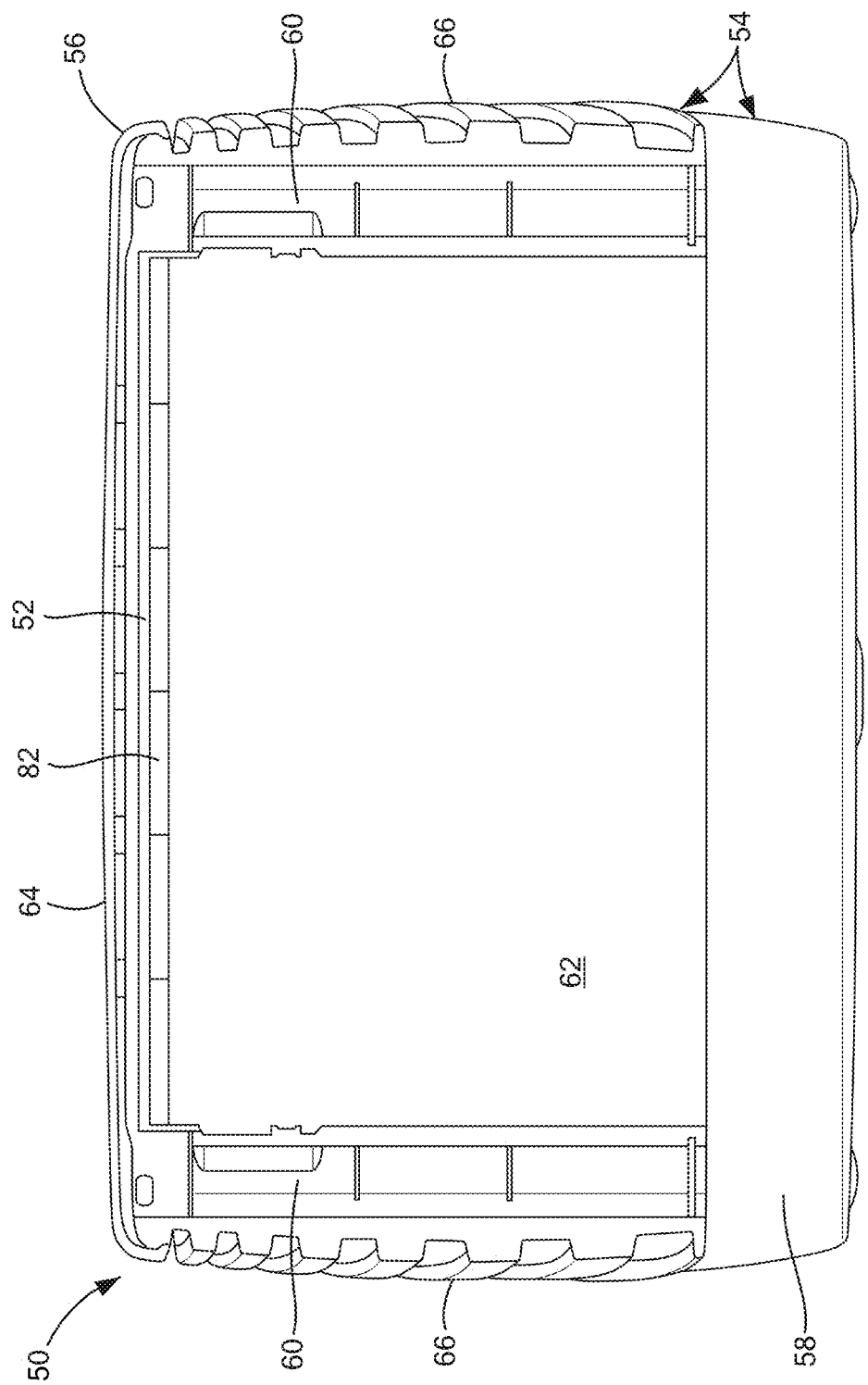
FIG. 2 shows a cross-sectional view of a first embodiment of an evaporative cooler having a pressurized water distribution system.

The system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Referring to FIGS. 2-16, a first embodiment and a second embodiment of an evaporative cooler of the present disclosure are shown. Unlike currently known evaporative coolers, the evaporative coolers shown in FIGS. 2-16 each include a pressurized water distribution system, which is discussed in greater detail below. Although the evaporative coolers disclosed herein are described as being used with water, it will be understood that other evaporative fluids may be used in addition to or instead of water. In one embodiment, the pressurized water distribution system includes a distribution assembly (that distributes water through a combination of pressure and gravity) that has a height of approximately 65 mm (±20 mm). The evaporative coolers disclosed here do not include a header block or a gap between the distribution assembly and the evaporative media pad(s). Thus, the total height required to supply water to the evaporative media pad(s) is the same as the total height of the distribution assembly, or, in one embodiment, approximately 65 mm. By not only reducing the height of the distribution component over currently known water distribution systems, but also eliminating the 20-mm gap and the 30-mm header block, the total height of the evaporative cooler may be reduced by approximately 109 mm. Alternatively, the total height of the evaporative cooler may be maintained, but larger evaporative media pad(s) may be used, thereby increasing the active cooling area and cooling capacity. In one embodiment, the active cooling area of the evaporative media pad(s) may be increased by as much as 24% when a pressurized water distribution system as described herein is used. Additionally, as is discussed in greater detail below, use of a pressurized water distribution system also reduces or eliminates the need for precise vertical positioning of the evaporative media pad(s), which may reduce time and complexity of installing, repairing, and/or replacing of the evaporative cooler. In fact, in some embodiments, an evaporative cooler including the pressurized water distribution system described herein may be installed at angles of up to between 5° and 45° from horizontal.

Referring now to FIGS. 2-8, the first embodiment of the evaporative cooler 50 including a pressurized water distribution system 52 is shown. In addition to the pressurized water distribution system 52, the evaporative cooler 50 generally includes a housing 54 with a housing lid 56 and a reservoir 58, and a retaining frame 60 configured to retain at least one evaporative media pad 62. The housing lid 56 may define at least a top surface 64 of the evaporative cooler 50, and may optionally further define at least one side surface 66 of the evaporative cooler 50. In one embodiment, the housing lid 56 is a unitary structure composed of a single piece and defines a top surface 64 and four side surfaces 66 of the evaporative cooler 50, and is coupled to, and, optionally, in contact with, the reservoir 58 when the evaporative cooler 50 is assembled. Although not shown in FIGS. 2-8, the first embodiment of the evaporative cooler 50 may further include additional components, such one or more sensors, electronic controls, float valves, filters, a fan and fan motor, belts, pulleys, an auxiliary pump for draining the reservoir, ductwork, roof jacks, and/or other system components.

Figure 3:
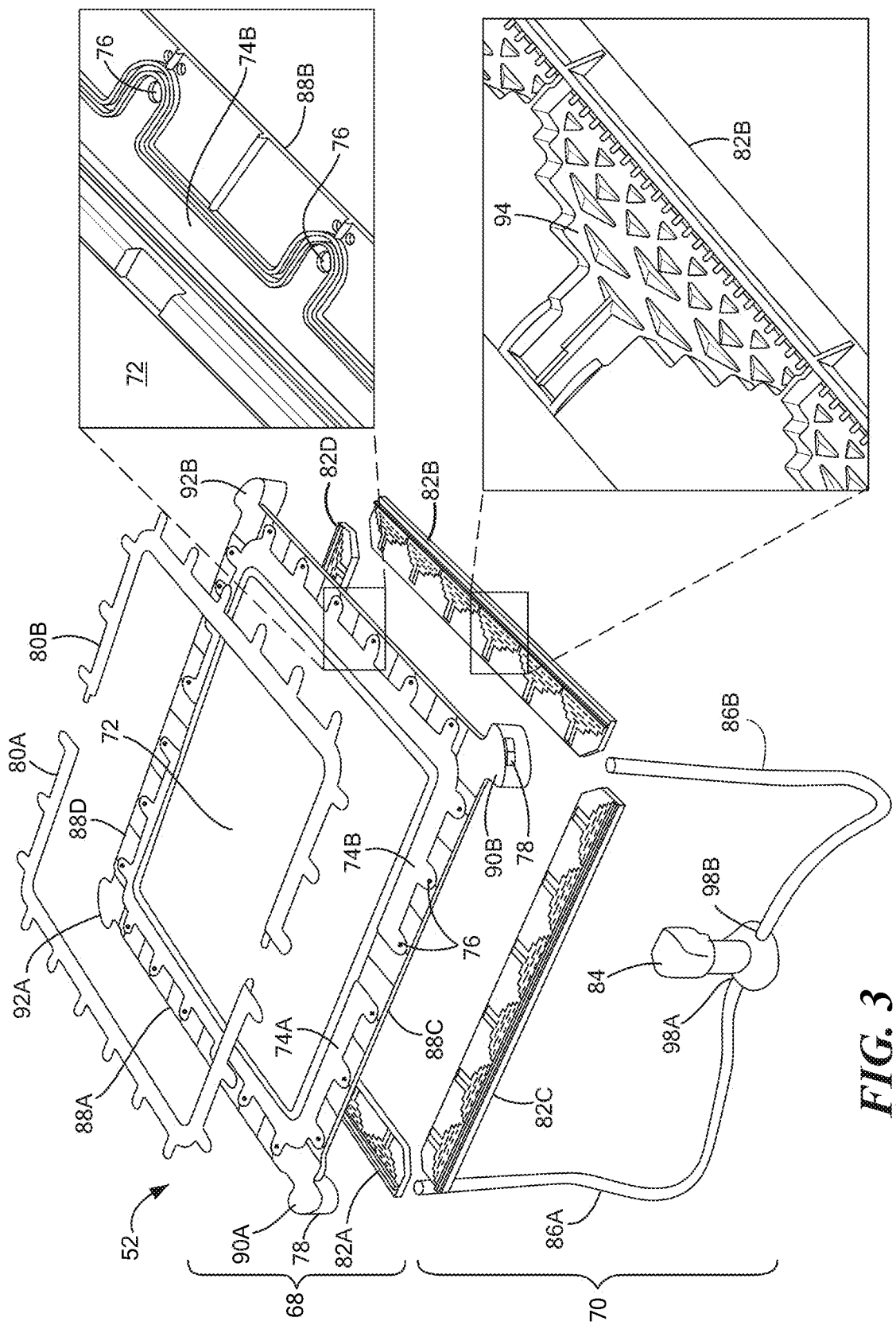
FIG. 3 shows an exploded view of the pressurized water distribution system of the evaporative cooler of FIG. 2.

Referring to FIG. 3, an exploded view of the pressurized water distribution system 52 is shown. The pressurized water distribution system 52 generally includes a distribution assembly 68 and a supply assembly 70. The distribution assembly 68 includes a pressurized portion and a non-pressurized flow path portion. The distribution assembly 68 includes a water distribution system lid 72 including or defining a pressurized manifold that includes at least one pressurized water channel 74 that is in fluid communication with a plurality of outlet holes 76 and at least one inlet hole 78. The distribution assembly 68 further includes at least one manifold cover 80 configured to enclose the at least one pressurized water channel 74, but not the plurality of outlet holes 76 or the at least one inlet hole 78. Put another way, each manifold cover 80 is configured to enclose a corresponding pressurized water channel 74, with the plurality of outlet holes 76 and the at least one inlet hole 78 remaining unobstructed when the manifold cover 80 is coupled to the water distribution system lid 72. The distribution assembly 68 further includes at least one gravity distribution element 82 defining at least one non-pressurized flow path. As used herein, water conduits through which water flows primarily by gravity are non-pressurized conduits. The supply assembly 70 includes a pump 84 and a plurality of hoses 86. Water pumped into the pressurized manifold through the at least one inlet hole 78 is pressurized by the pump 84 and the enclosed pressurized water supply manifold. As discussed in greater detail below, water is delivered to the evaporative media pad(s) by a combination of momentum created by the pump and enclosed pressurized water supply manifold, and gravity.

Figure 5:
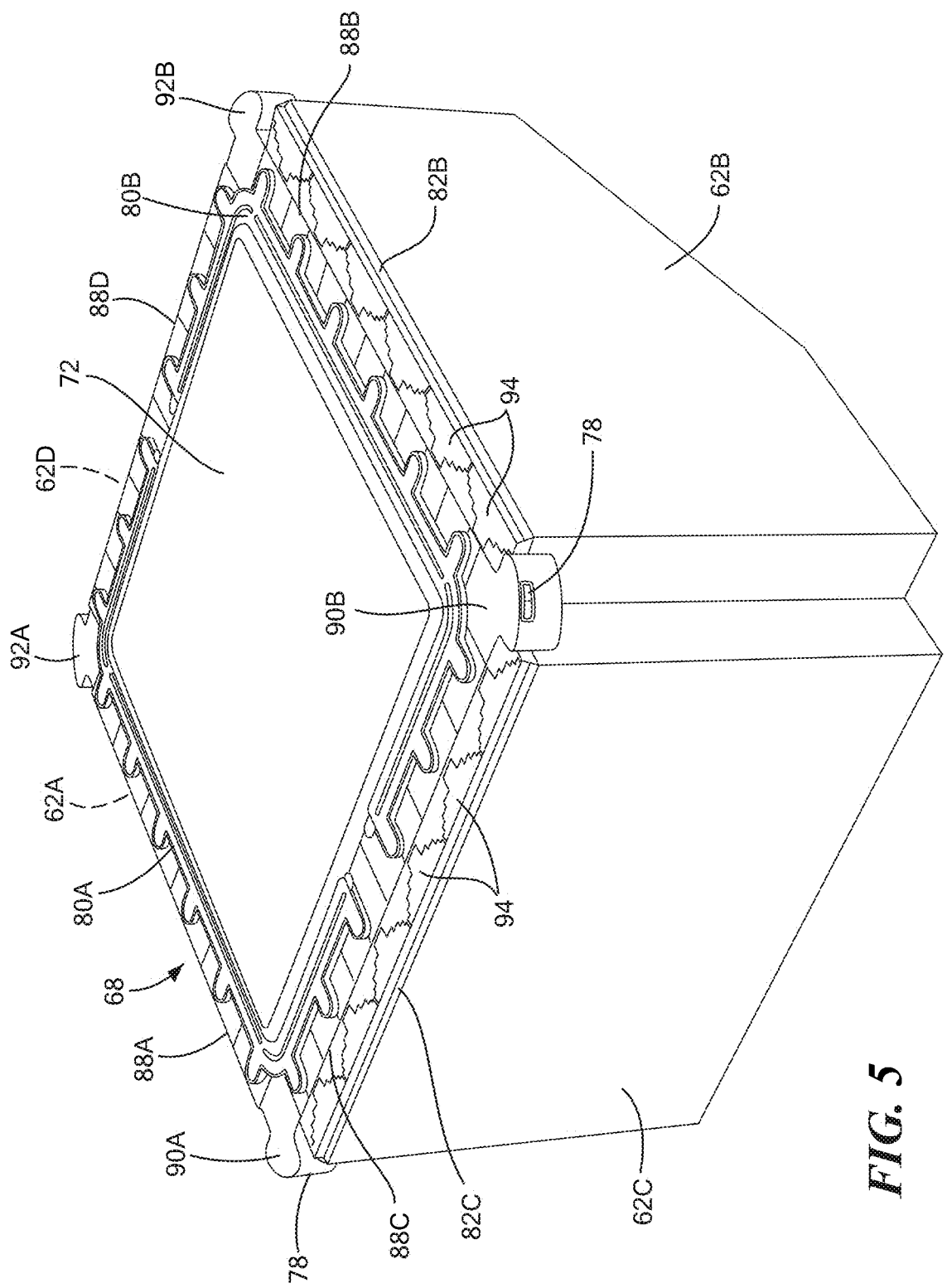
FIG. 5 shows a top perspective view of the pressurized water distribution system and evaporative media pads of the evaporative cooler of FIG. 2.
Figure 6:
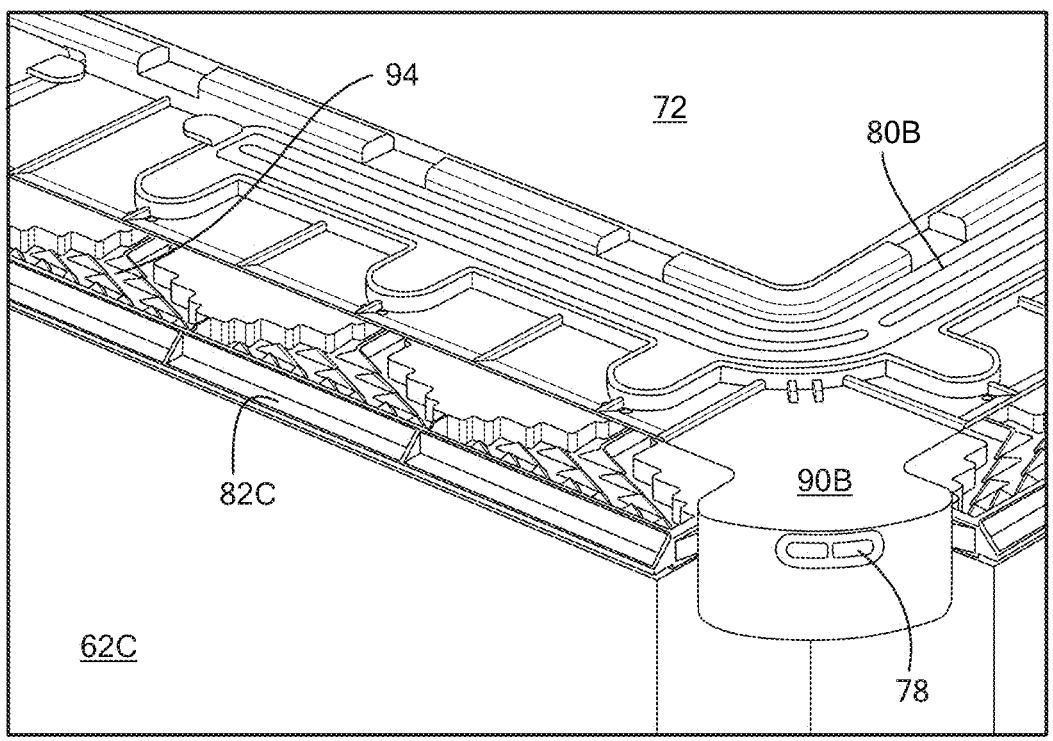
FIG. 6 shows a close-up view of a portion of the pressurized water distribution system and evaporative media pads of the evaporative cooler of FIG. 2.

The water distribution system lid 72 is sized and configured to be received within the housing 54. In one embodiment, such as that shown in FIG. 3, the water distribution system lid 72 is square or rectangular with a first edge 88A, a second edge 88B opposite the first edge 88A, a third edge 88C between the first 88A and second 88B edges, and a fourth edge 88D opposite the third edge 88C and between the first 88A and second 88B edges. In one embodiment, the water distribution system lid 72 includes a water inlet portion 90 located at at least one corner of the water distribution system lid 72. In one embodiment, the water distribution system lid 72 includes a first water inlet portion 90A at a first corner between the first edge 88A and the third edge 88C, and includes a second water inlet portion 90B at a second corner between the second edge 88B and the third edge 88C. Each of the first 90A and second 90B water inlet portions extends beyond each adjacent edge, such that the first 90A and second 90B water distribution portions are not located above any of the evaporative media pad(s) 62 (for example, as shown in FIGS. 5 and 6). Optionally, to maintain symmetry of the water distribution system lid 72, the water distribution system lid 72 may also include a first protruding portion 92A at a third corner between the first edge 88A and the fourth edge 88D and a second protruding portion 92B at a fourth corner between the second edge 88B and the fourth edge 88D, and the protruding portions 92A, 92B may each have a size and configuration equal to that of the water inlet portions 90A, 90B, except that the protruding portions 92A, 92B do not include at least one inlet hole 78. The water distribution system lid 72 may be composed of a rigid or semi-rigid material, such as high-density polyethylene (HDPE), low-density polyethylene (LDPE), polypropylene (PP), polyvinyl chloride (PVC), or the like.

The plurality of outlet holes 76 and the pressurized water channel(s) 74 are included in or defined by a perimeter portion of the water distribution system lid 72 In one embodiment, the plurality of outlet holes 76 includes six evenly spaced outlet holes 76 proximate each of the first 88A, second 88B, third 88C, and fourth 88D edges (twenty-four total outlet holes 76). However, it will be understood that the water distribution system lid 72 may include any suitable number, configuration, and/or arrangement of outlet holes 76. Further, each outlet hole 76 has a diameter that is large enough to prevent or reduce the likelihood of blockage by sediment or other particulates in the water being circulated through the pressurized water distribution system 52. In one embodiment, each outlet hole 76 has a diameter of approximately 8 mm (±0.5 mm). In another embodiment, each outlet hole has a diameter of between approximately 4 mm and approximately 5 mm (±0.5 mm).

In one embodiment, the at least one pressurized water channel 74 is also included or defined by the perimeter portion of the water distribution system lid 72. In one embodiment, the water distribution system lid 72 includes or defines a first pressurized water channel 74A and a second pressurized water channel 74B, with the first pressurized water channel 74A being in fluid communication with all of the plurality of outlet holes 76 proximate the first edge 88A (for example, six outlet holes 76), a first half of the plurality of outlet holes 76 proximate the third edge 88C (for example, three outlet holes 76), and a first half of the plurality of outlet holes 76 proximate the fourth edge 88D (for example, three outlet holes 76). Similarly, in this configuration, the second pressurized water channel 74B is in fluid communication with all of the plurality of outlet holes 76 proximate the second edge 88B (for example, six outlet holes 76), a second half of the plurality of outlet holes 76 proximate the third edge 88C (for example, three outlet holes 76 proximate the third edge 88C different than the three outlet holes 76 in fluid communication with the first pressurized water channel 74A), and a second half of the plurality of outlet holes 76 proximate the fourth edge 88D (for example, three outlet holes 76 proximate the fourth edge 88D different than the three outlet holes 76 in fluid communication with the first pressurized water channel 74A). The first pressurized water channel 74A is also in fluid communication with the at least one inlet hole 78 in the first water inlet portion 90A and the second pressurized water channel 74B is also in fluid communication with the at least one inlet hole 78 in the second water inlet portion 90B.

Figure 7:
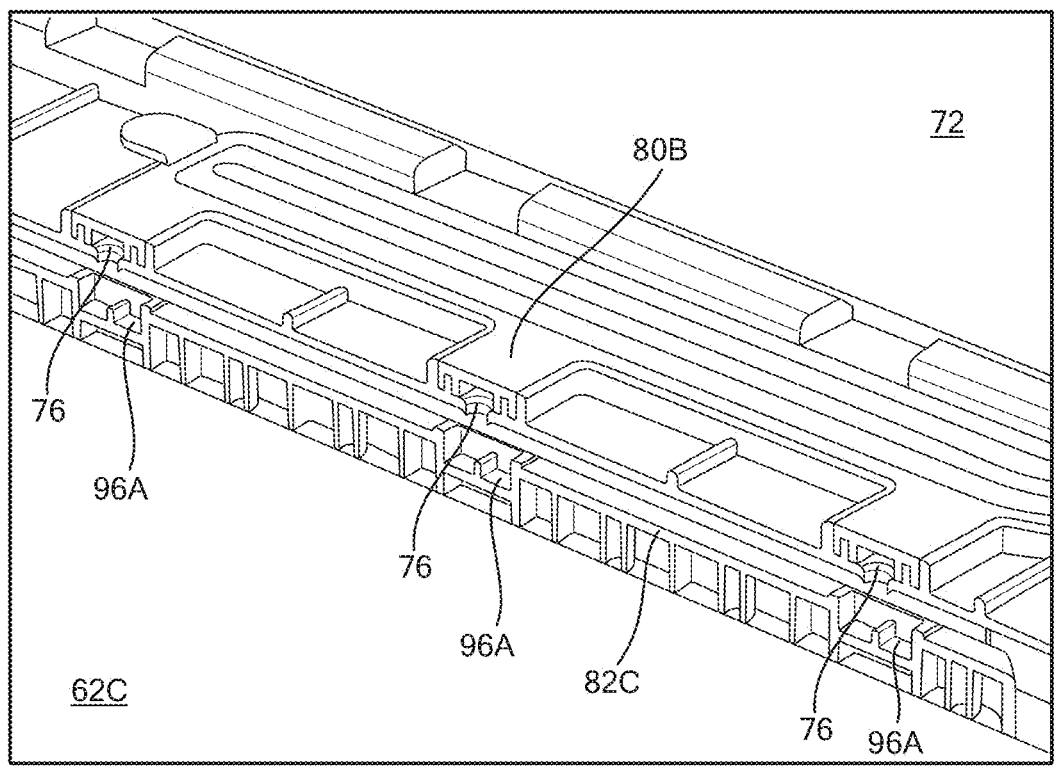
FIG. 7 shows a cross-sectional view of a portion of the pressurized water distribution system and evaporative media pads of the evaporative cooler of FIG. 2.

The distribution assembly 68 of the pressurized water distribution system 52 further includes at least one manifold cover 80 that is sized and configured to enclose the at least one pressurized water channel 74 in the water distribution system lid 72, but not the at least one inlet hole 78 or the plurality of outlet holes 76, such that water may enter the pressurized water channel(s) 74 only through the at least one inlet hole 78 and water may exit the pressurized water channel(s) 74 only through the plurality of outlet holes 76. Put another way, the manifold cover 80 is configured to enclose the portion of the pressurized manifold between the at least one inlet hole 78 and the plurality of outlet holes 76. The manifold cover(s) 80 are composed of a compressible or semi-compressible, resilient material, such as rubber, silicone rubber, foam, neoprene, or the like. Further, the manifold cover(s) 80 are configured to be removably coupled to the water distribution system lid 72, such as by friction fit, clamps, or other suitable methods of attachment, to facilitate removal, repair, replacement, and/or cleaning of the water distribution system lid 72. In one non-limiting example, as is shown in FIG. 7, the manifold cover(s) 80 and the pressurized water channel(s) 74 (or the portion of the water distribution system lid 72 adjacent the pressurized water channel(s) 74) may have a matably engageable tongue-and-groove configuration that allows for a friction fit between the manifold cover(s) 80 and corresponding pressurized water channel(s) 74 and/or water distribution system lid 72. In one embodiment, the distribution assembly 68 includes a first manifold cover 80A that is sized and configured to at least partially enclose the first pressurized water channel 74A and a second manifold cover 80B that is sized and configured to at least partially enclose the second pressurized water channel 74B (for example, as shown in FIG. 3). Alternatively, the manifold cover 80 may be permanently coupled to, integrated with, or defined by the water distribution system lid 72. In one embodiment, the manifold cover 80 may be plastic welded, adhered, or otherwise coupled to the water distribution system lid 72. In another embodiment, the water distribution system lid may be manufactured as a single piece to define the pressurized manifold (for example, the pressurized water channel(s) 74) and the manifold cover 80.

The distribution assembly 68 of the pressurized water distribution system 52 further includes at least one gravity distribution element 82 (which may also be referred to herein as at least one water spreader). The gravity distribution element(s) 82 define at least one non-pressurized flow path and are configured to be in fluid communication with the pressurized water channel(s) 74 and the evaporative media pad(s) 62. Thus, when the evaporative cooler 50 is assembled, the water distribution system lid 72 and gravity distribution element(s) 82 are located between the housing lid 56 and the evaporative media pad(s) 62. The distribution assembly 68 may include an equal number of evaporative media pads 62 and gravity distribution elements 82, such that each gravity distribution element 82 is located directly adjacent to and, in some embodiments, in contact with, a corresponding one of the evaporative media pads 62. Put another way, each evaporative media pad 62 is located directly subjacent a corresponding one of the gravity distribution elements 82, without a header block, when the evaporative cooler 50 is in use. In some embodiments, the water distribution system lid 72 may be located a predetermined distance from the upper edge or top of each of the evaporative media pads 62 when the evaporative cooler 50 is assembled. In one embodiment, the predetermined distance is between approximately 4 mm and approximately 5 mm (±0.2 mm). In another embodiment, the predetermined distance is between approximately 9 mm and approximately 10 mm (±0.2 mm).

In one embodiment, the evaporative cooler 50 includes four evaporative media pads 62 and four gravity distribution elements 82, with each gravity distribution element 82 being directly above and, in some embodiments, in contact with, a corresponding evaporative media pad 62. For example, the distribution assembly 68 may include a first gravity distribution element 82A in fluid communication with the outlet holes 76 proximate the first edge 88A of the water distribution system lid 72, a second gravity distribution element 82B in fluid communication with the outlet holes 76 proximate the second edge 88B of the water distribution system lid 72, a third gravity distribution element 82C in fluid communication with the outlet holes 76 proximate the third edge 88C of the water distribution system lid 72, and a fourth gravity distribution element 82D in fluid communication with the outlet holes 76 proximate the fourth edge 88D of the water distribution system lid 72. In one embodiment, when the evaporative cooler 50 is assembled, the first 82A, second 82B, third 82C, and fourth 82D gravity distribution elements are located directly above a first 62A, second 62B, third 62C, and fourth 62D evaporative media pad, respectively. The retaining frame 60 may be configured to retain the four evaporative media pads 62A-62D such that the evaporative media pads 62 are approximately 90° from each other, forming a box shape. The box shape defines an inner chamber, within which a fan, fan motor, and other system components may be located.

Figure 4:
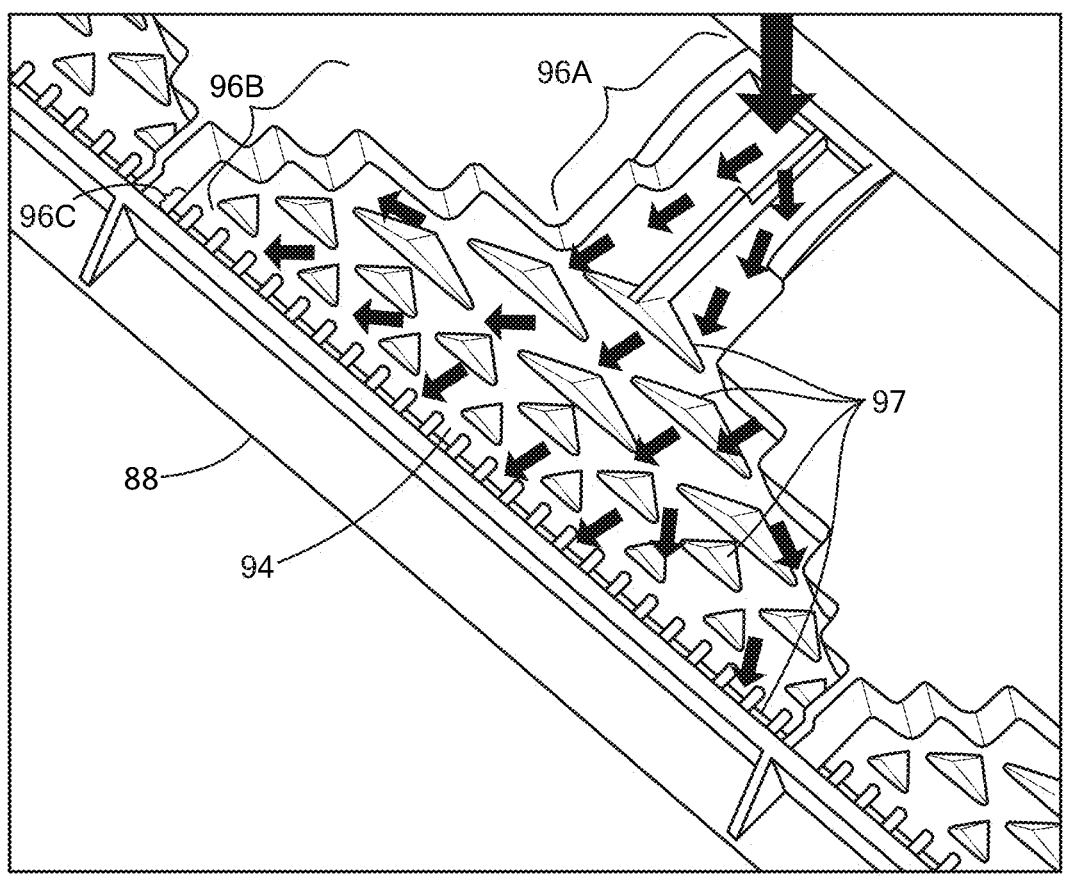
FIG. 4 shows a close-up view of an upper surface of a gravity distribution element of the pressurized water distribution system of the evaporative cooler of FIG. 2.

In one embodiment, each gravity distribution element 82 has an elongate shape that is configured to extend between adjacent water inlet portions 90 and/or protruding portions 92 (for example, as shown in FIG. 5). Further, each gravity distribution element 82 includes an upper surface with a plurality of distribution features 94 that provide an even delivery of water to the evaporative media pad(s) 62 (for example, as shown in FIG. 4). In one embodiment, the water distribution system lid 72 includes six outlet holes 76 proximate each of the first 88A, second 88B, third 88C, and fourth 88D edges, and each of four gravity distribution elements 82A-82D includes six distribution features 94, each distribution feature 94 including an upstream portion 96A, a midstream portion 96B, and a downstream portion

96C. Each gravity distribution element 82 is configured such that at least a portion of the upstream portion 96A is located immediately adjacent to a corresponding outlet hole 76 in the water distribution system lid 72 when the evaporative cooler 50 is assembled (for example, as shown in FIGS. 6 and 7). When the evaporative cooler 50 is in use, at least a portion of the upstream portion 96A is located beneath (directly subjacent to) a corresponding outlet hole 76. At least a portion of the upper surface of each gravity distribution element 82 may extend beyond its corresponding edge 88. Further, each gravity distribution element 82 may be composed of rigid or semi-rigid material, such as high-density polyethylene (HDPE), low-density polyethylene (LDPE), polypropylene (PP), polyvinyl chloride (PVC), acrylonitrile-butadiene-styrene (ABS), acrylonitrile-styrene-acrylate (ASA), cellulose flock, cellulose fiber, or the like.

As shown in FIG. 4, each distribution feature 94 is configured such that an amount of water entering the distribution feature 94 from the corresponding outlet hole 76 is progressively divided into an increasing number of non-pressurized flow paths (or gradually spread over an increasing area) by an increasing number of protrusions or ridges 97 in the distribution feature as the water passes from the upstream portion 96A to the midstream portion 96B and on to the downstream portion 96C. In one embodiment, the flow of water is divided into two non-pressurized flow paths in the upstream portion 96A, and is then is divided into an increasing number of non-pressurized flow paths in the midstream portion 96B and then the downstream portion 96C, until the flow of water is evenly spread along the length of the gravity distribution element 82 (for example, until the flow of water is evenly spread across all six distribution features 94), which may generally correspond to a width of the corresponding evaporative media pad 62. Thus, the evaporative media pad 62 receives an evenly distributed supply of water.

The supply assembly 70 includes a pump 84 that may be located within the housing 54, such as within the reservoir 58. In one embodiment, the supply assembly 70 also includes a first hose 86A and a second hose 86B. A first end of the first hose 86A is coupled to a first pump outlet 98A and a second end of the first hose 86A is coupled to the at least one inlet hole 78 in the first water inlet portion 90A. A first end of the second hose 86B is coupled to a second pump outlet 98B and a second end of the second hose 86B is coupled to the at least one inlet hole 78 in the second water inlet portion 90B. Thus, in one embodiment, the pump 84 is configured to supply water to each of the first 74A and second 74B pressurized water channels.

Unlike currently known water distribution systems, water is effectively pressurized within the enclosed pressurized water channel(s) 74 of the pressurized water distribution systems 52 disclosed herein. The pump 84 and enclosed pressurized water channel(s) 74 provide momentum pressure to the water, with the outlet holes 76 further metering water flow within the pressurized water channel(s) 74 by providing restriction to the water flow. The force created by the pump 84 and pressurization of water within the enclosed pressurized water channel(s) 74, in combination with the restriction of the outlet holes 76, provides the water with a high enough flow rate and/or pressure to ensure even distribution throughout the manifold and onto the evaporative media pad(s) 62 without relying on gravity alone.

When the pressurized water distribution system 52 is assembled, the distribution assembly 68, which includes the water distribution system lid 72 with manifold, manifold cover(s) 80, and gravity distribution element(s) 82, has a height of approximately 65 mm (±20 mm). This height is less than that of gravity distribution elements 24 of currently known water distribution systems, typically approximately 124 mm. Further, when the evaporative cooler 50 is assembled, the evaporative cooler 50 does not include a header block (for example, a header block having a height of approximately 30-mm) or a gap between the distribution assembly 68 and the evaporative media pad(s) 62 (for example, a 20-mm gap). Therefore, the distribution assembly 68 of the pressurized water distribution system 52 disclosed herein may reduce the overall height required to delivery water to the evaporative media pad(s) 62 by approximately 109 mm. This allows for the use of larger evaporative media pads 62 (and, therefore, an increase in the active cooling area of the evaporative media pad(s) 62) and/or an evaporative cooler 50 with smaller dimensions that currently known evaporative coolers 10.

Figure 8:
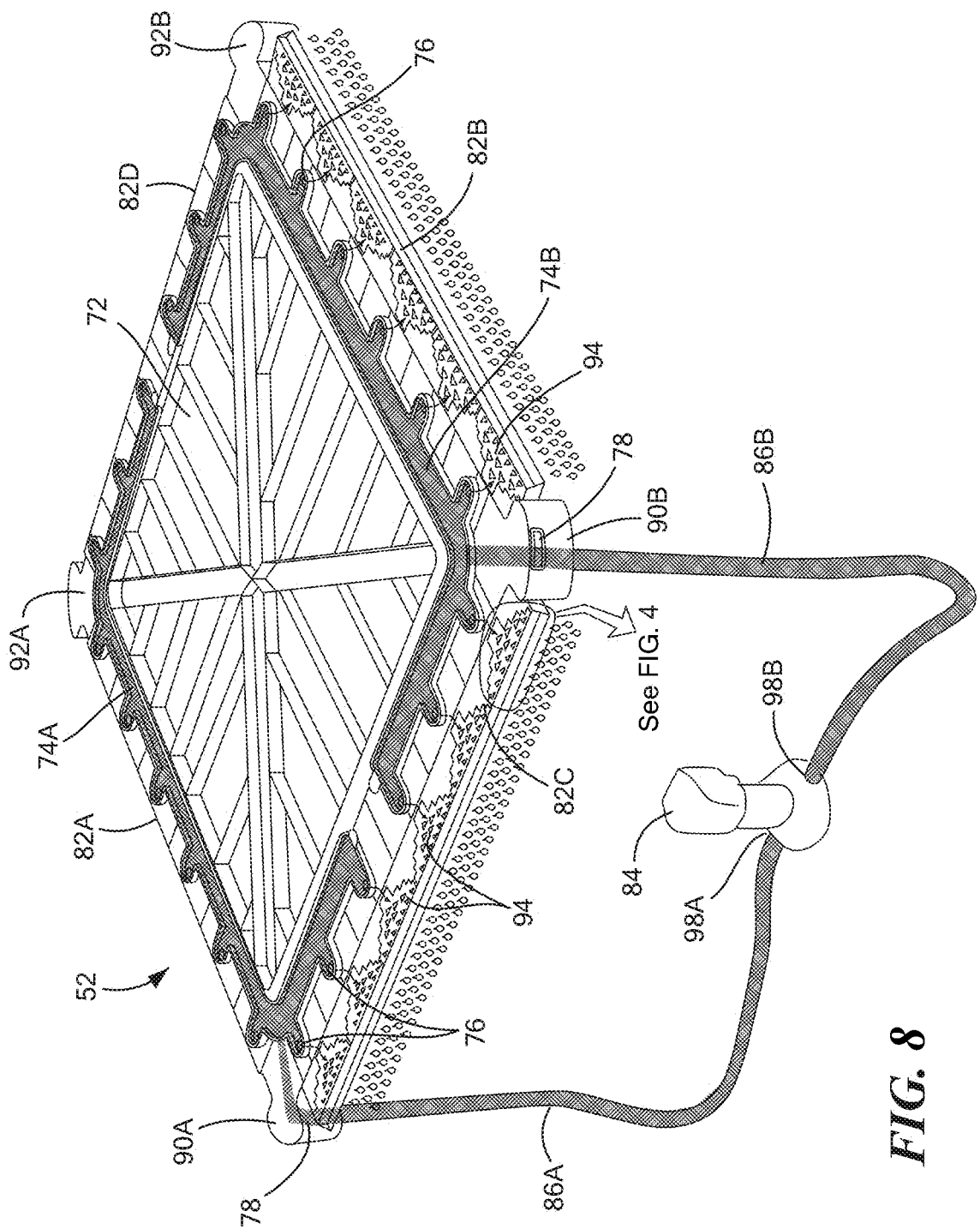
FIG. 8 shows a perspective interior view of the pressurized water distribution system of the evaporative cooler of FIG. 2 during use.

Referring to FIG. 8, an interior view of the pressurized water distribution system 52 of the evaporative cooler 50 is shown during use. In one configuration, the pump 84 intakes water from the reservoir 58, then divides the water into two flow paths: one flow path into a first hose 86A and a second flow path into a second hose 86B. In the first flow path, water flows through the first hose 86A into at least one inlet hole 78 in a first water inlet portion 90A. From the at least one inlet hole 78, water in the first flow path flows into a first pressurized water channel 74A of the manifold, and then into a first plurality of outlet holes 76. From the first plurality of outlet holes 76, water in the first flow path flows into a plurality of non-pressurized flow paths created by the plurality of distribution features 94 of at least one gravity distribution element 82. Within each distribution feature 94, water is continually divided as it passes from an upstream portion 96A to a midstream portion 96B, then to downstream portion 96C, from where the water is evenly distributed on at least one evaporative media pad 62. In one embodiment, water from the first flow path is distributed onto three of four evaporative media pads 62 (for example, onto the entire width of a first evaporative media pad 62A, and onto a portion of the width of each of a third 62C and fourth 62D evaporative media pad). In the second flow path, water flows through the second hose 86B into at least one inlet hole 78 in a second water inlet portion 90B. From the at least one inlet hole 78, water in the second flow path flows into a second pressurized water channel 74B of the manifold. Water in the second flow path then flows from the second pressurized water channel 74B through a second plurality of outlet holes 76. From the second plurality of outlet holes 76, water in the second flow path flows into a plurality of non-pressurized flow paths created by a plurality of distribution features 94 of at least one gravity distribution element 82. Within each distribution feature 94, water is continually divided as it passes from an upstream portion 96A to a midstream portion 96B, then to downstream portion 96C, from where the water is evenly distributed on at least one evaporative media pad 62. In one embodiment, water from the second flow path is distributed onto three of four evaporative media pads 62 (for example, onto the entire width of a second evaporative media pad 62B, and onto a portion of the width of each of the third 62C and fourth 62D evaporative media pads). Thus, the collective amount of water flowing through the two flow paths is evenly distributed onto all four evaporative media pads 62.

Referring now to FIGS. 9-16, the second embodiment of the evaporative cooler 100 including a pressurized water distribution system 102 is shown. In addition to the pressurized water distribution system 102, the evaporative cooler 100 generally includes a housing 104 with a housing lid 106 and a reservoir 108, and an internal retaining frame 110 configured to retain at least one evaporative media pad 112. The housing lid 106 may define a least a top surface 114 of the evaporative cooler 100, and may optionally further define at least one side surface 116 of the evaporative cooler 100. In one embodiment, the housing lid 106 is a unitary structure composed of a single piece and defines a top surface 114 and four side surfaces 116 of the evaporative cooler 100, and is coupled to, and, optionally, in contact with, the reservoir 108 when the evaporative cooler 100 is assembled. Further, as discussed in greater detail below, in one embodiment, the housing lid 106 also includes a plurality of airflow inlets 118 (put another way, the housing lid is perforated). The evaporative cooler 100 also includes a fan 120 and fan motor 122 at least partially located within an aperture in the reservoir 108 that is connected to ductwork into the building or structure on which the evaporative cooler 100 is mounted. Although not shown in FIGS. 9-16, the second embodiment of the evaporative cooler 100 may further include additional components, such one or more sensors, electronic controls, float valves, filters, belts, pulleys, an auxiliary pump for draining the reservoir, ductwork, roof jacks, and/or other system components.

Figure 9:
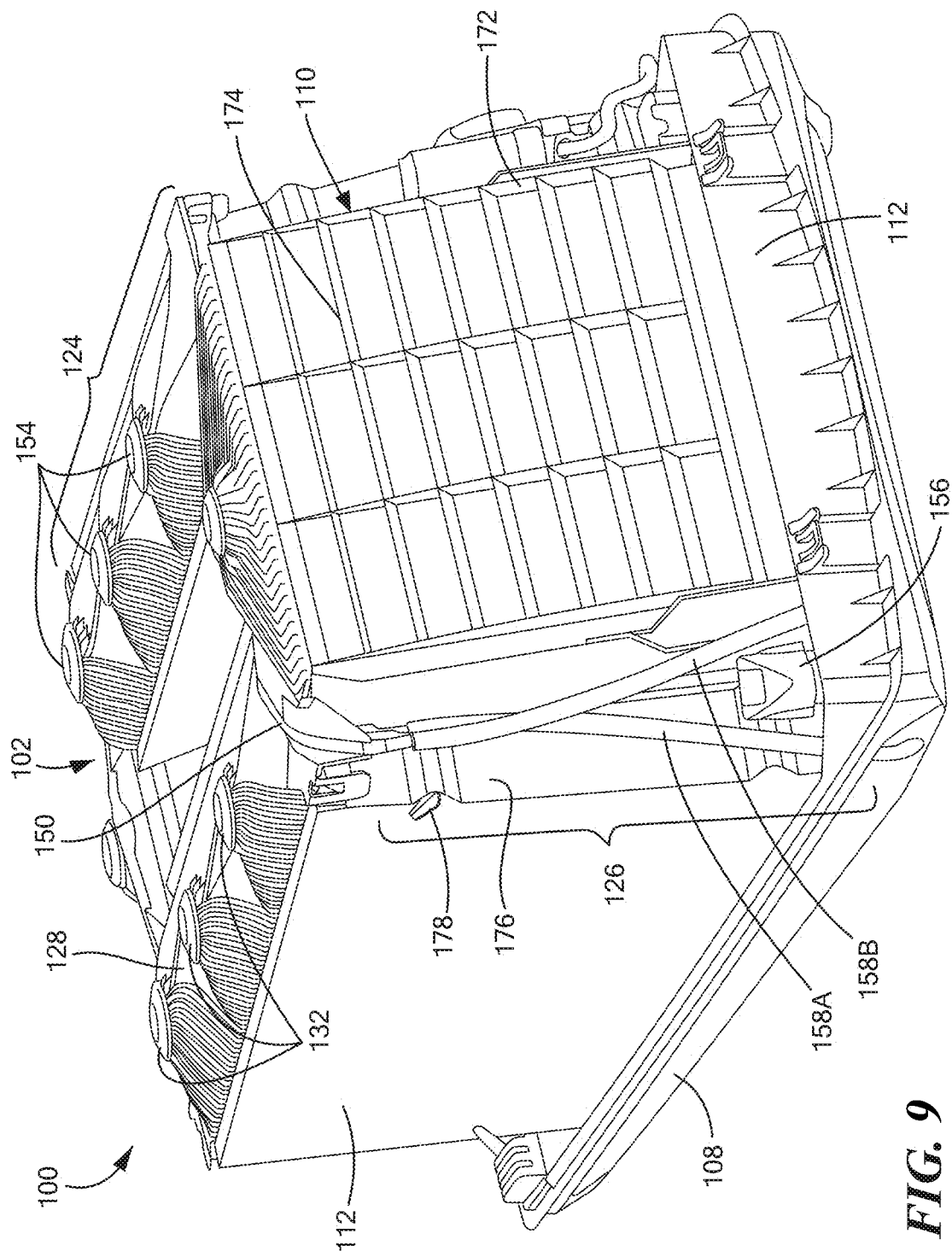
FIG. 9 shows a perspective view of an interior of a second embodiment of an evaporative cooler having a pressurized water distribution system.
Figure 11:
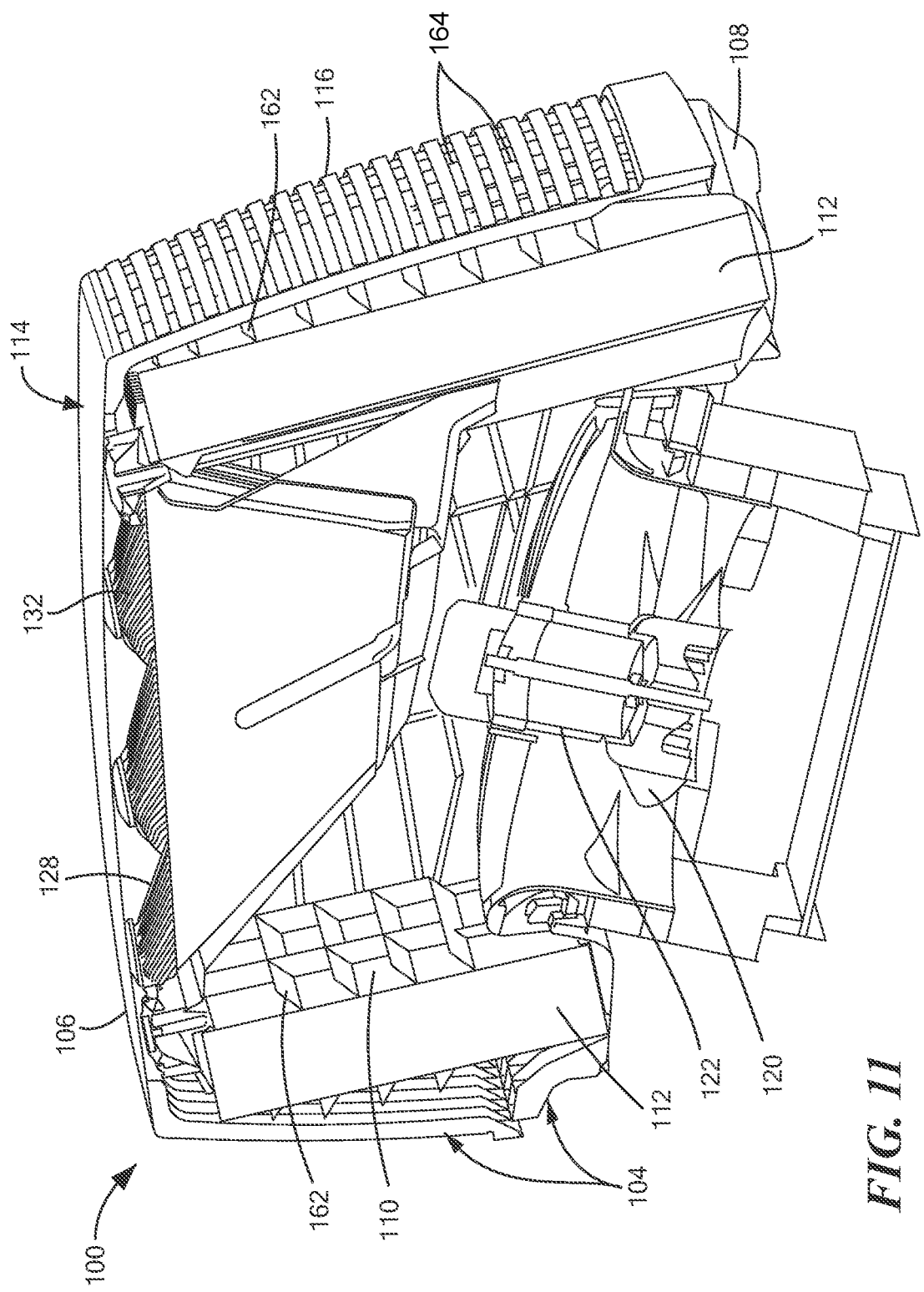
FIG. 11 shows a further cross-sectional view of the evaporative cooler of FIG. 9.
Figure 12:
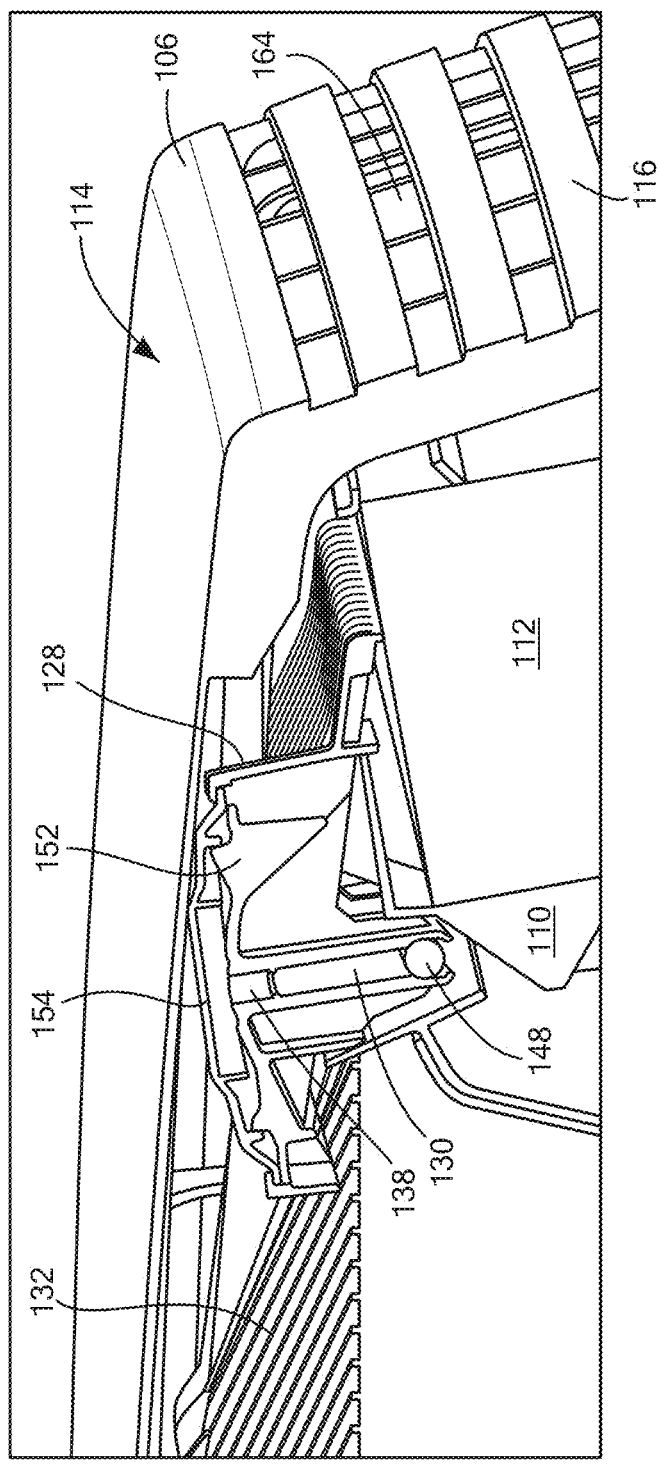
FIG. 12 shows a cross-sectional view of a portion of the pressurized water distribution system of the evaporative cooler of FIG. 9.
Figure 13:
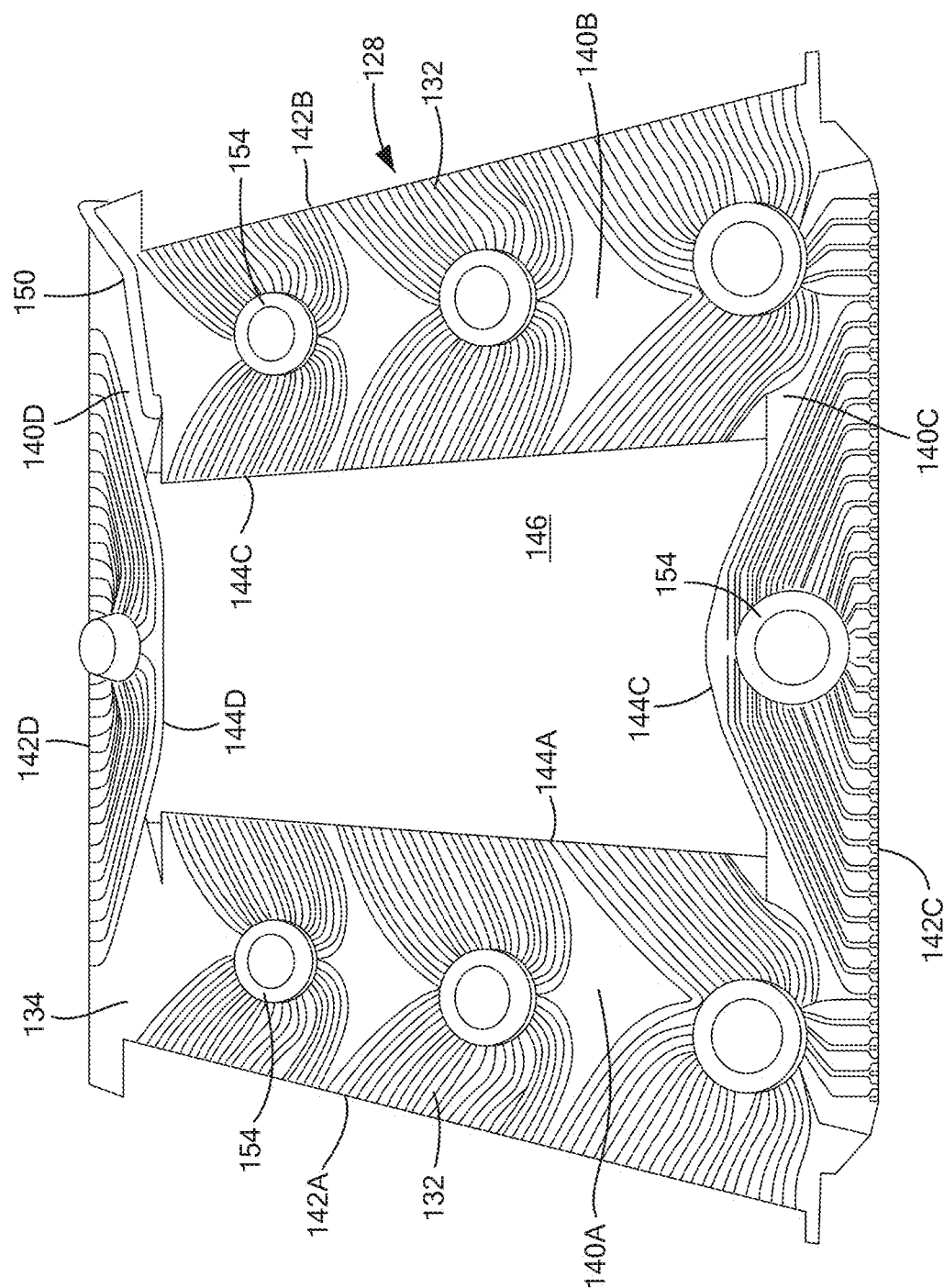
FIG. 13 shows an upper surface of a water distribution system lid of the pressurized water distribution system of the evaporative cooler of FIG. 9.
Figure 14:
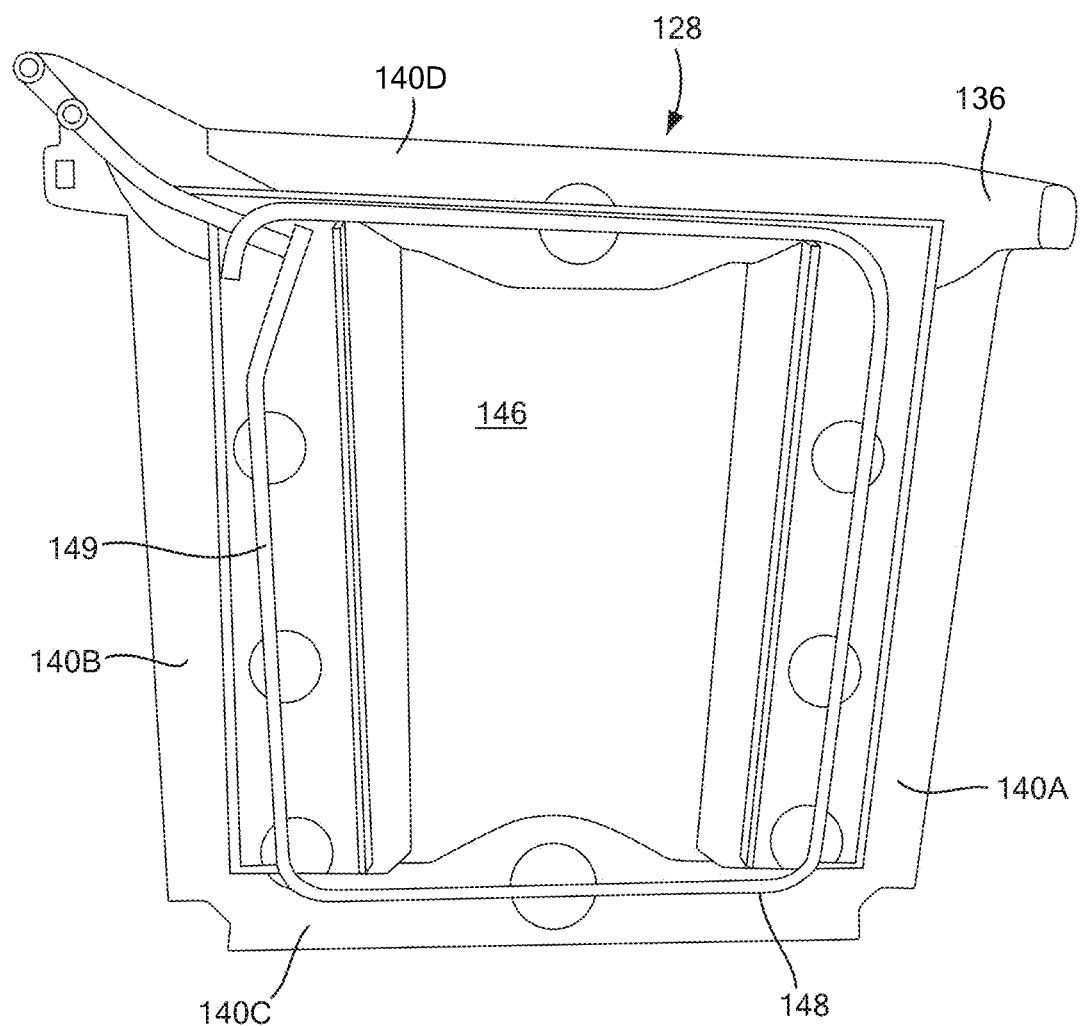
FIG. 14 shows a lower surface of the water distribution system lid of the pressurized water distribution system of the evaporative cooler of FIG. 9.
Figure 15:
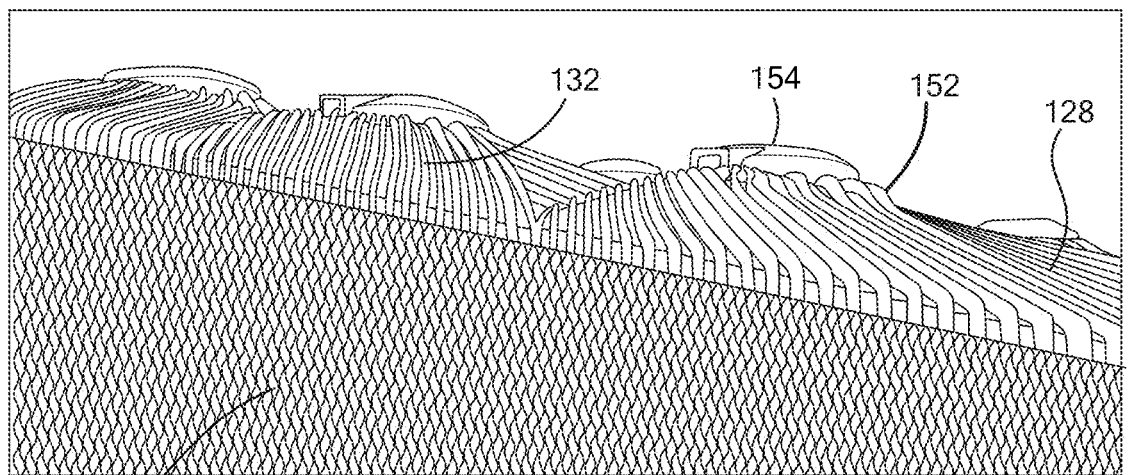
FIG. 15 shows a close-up view of the water distribution system lid of the pressurized water distribution system of the evaporative cooler of FIG. 9 positioned directly above an evaporative media pad, the water distribution system lid having a first configuration of non-pressurized gravity distribution water channels.
Figure 16:
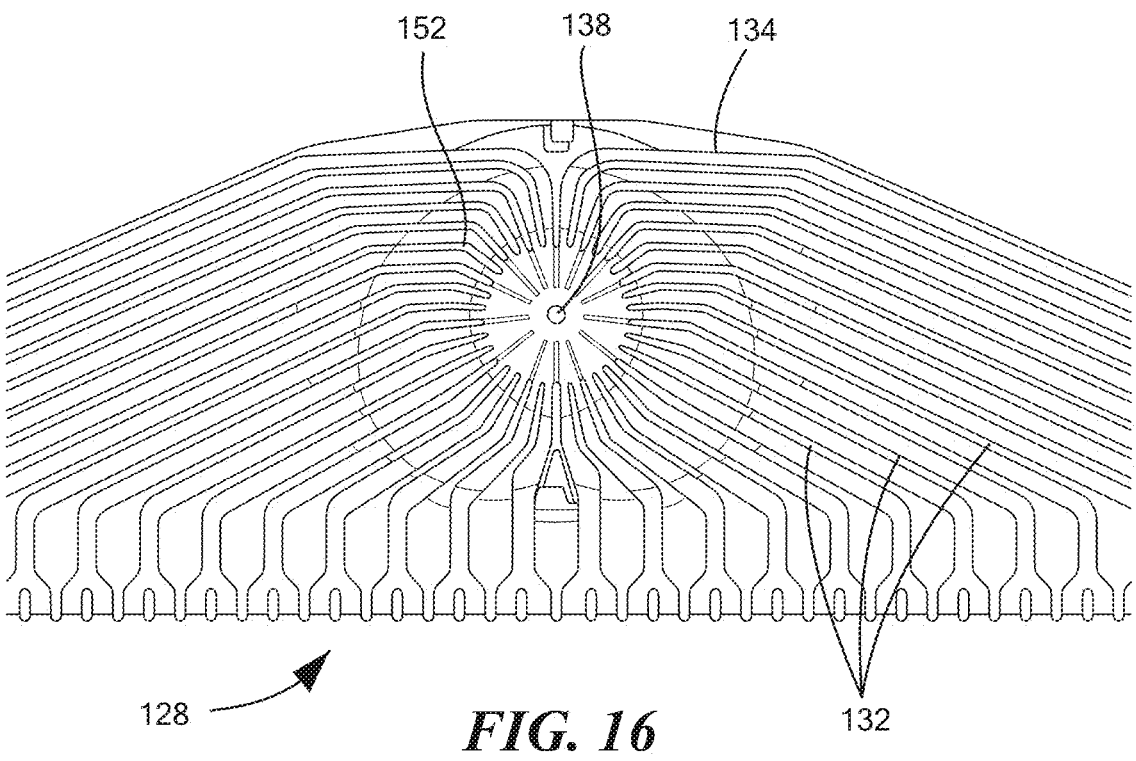
FIG. 16 shows a close-up view of the water distribution system lid of the pressurized water distribution system of the evaporative cooler of FIG. 9, the water distribution system lid having a second configuration of non-pressurized gravity distribution water channels.

Referring to FIG. 9, the second embodiment of the evaporative cooler 100 having a pressurized water distribution system 102 is shown without the housing lid 106. Similar to the pressurized water distribution system 52 of the first embodiment of an evaporative cooler 50 shown in FIGS. 2-8, the pressurized water distribution system 102 of the second embodiment of an evaporative cooler 100 shown in FIGS. 9-16 generally includes a distribution assembly 124 and a supply assembly 126. The distribution assembly 124 includes a pressurized flow path portion and a non-pressurized flow path portion. The distribution assembly 124 includes a water distribution system lid 128 including or defining a pressurized manifold that includes at least one pressurized water channel 130 (for example, as shown in FIG. 12), and also including or defining at least one gravity distribution water channel 132 that is not pressurized. The non-pressurized gravity distribution channel(s) 132 are in fluid communication with at least one pressurized water channel 130. In one embodiment, the water distribution system lid 128 has a first (upper) surface 134 and a second (lower) surface 136, the upper surface 134 including or defining a plurality of non-pressurized gravity distribution water channels 132 and the water distribution system lid further including or defining a plurality of pressurized water channels 130 extending between the upper 134 and lower 136 surfaces. A first configuration or pattern of non-pressurized gravity distribution water channels 132 is shown in FIGS. 9, 11, 13, and 15, and a second configuration or pattern of non-pressurized gravity distribution water channels 132 is shown in FIG. 16. As the water distribution system lid 128 is manufactured to include a plurality of non-pressurized gravity distribution water channels 132 without the need for additional components, the water distribution system lid 128 may be referred to as including integrated gravity distribution elements. The water distribution system lid 128 also includes a plurality of outlet holes 138. In one embodiment, the water distribution system lid 128 has a rectangular, or at least substantially rectangular, shape, with a first side 140A defining a first outer edge 142A and first inner edge 144A, a second side 140B defining a second outer edge 142B and second inner edge 144B, a third side 140C defining a third outer edge 142C and third inner edge 144C, and a fourth side 140D defining a fourth outer edge 142D and fourth inner edge 144D, which sides surround a center aperture 146 (for example, as shown in FIGS. 13 and 14). In one embodiment, the first 140A and second 140B sides are longer than the third 140C and fourth 140D sides. In one embodiment, the water distribution system lid includes eight outlet holes 138, with three outlet holes 138 being in each of the longer first 140A and second 140B sides and one outlet hole 138 being in each of the shorter third 140C and fourth 140D sides. However, it will be understood that the water distribution system lid 128 may include any suitable number and/or configuration of outlet holes 138. Each outlet hole 138 has a diameter that is large enough to prevent or reduce the likelihood of blockage by sediment or other particulates in the water being circulated through the pressurized water distribution system. In one embodiment, each outlet hole 138 has a diameter of approximately 8 mm (±0.5 mm). In another embodiment, each outlet hole 138 has a diameter of between approximately 4 mm and approximately 5 mm (±0.5 mm).

The water distribution system lid 128 also includes at least one water supply channel 148 that is included in, defined by, retained within, coupled to, or otherwise on or in the lower surface 136 of the water distribution system lid 128. The water supply channel 148 is pressurized, and therefore may be referred to as being part of the pressurized manifold. The water supply channel(s) 148 includes at least one inlet hole (not shown) and at least one outlet hole (not shown), such that each of the at least one outlet hole of the water supply channel 148 is in fluid communication with a corresponding one of the plurality of outlet holes 138 in the water distribution system lid 128. In one embodiment, the lower surface of the water distribution system lid 128 defines a water supply channel 148 that completely or at least partially surrounds the center aperture 146 of the water distribution system lid 128. In such a configuration, the water distribution system lid 128 further includes a water supply channel cover 149 that is sized and configured to enclose the water supply channel(s) such that water may enter the water supply channel 148 only through the at least one inlet hole and water may exit the water supply channel 148 only through the plurality of outlet holes (from where the water passes into the plurality of outlet holes 138 in the water distribution system lid 128), as discussed above regarding the first embodiment of the evaporative cooler 50. The water supply channel cover 149 may be composed of a compressible or semi-compressible, resilient material, such as rubber, silicone rubber, foam, neoprene, or the like. In one embodiment, the water supply channel cover 149 is an elongate piece of rubber, foam, or similar material that at least partially received within the water supply channel(s) 148 (for example, as shown in FIG. 4. Further, the water supply channel cover 149 is configured to be removably coupled to the water distribution system lid 128, such as by friction fit, clamps, or other suitable methods of attachment, to facilitate removal, repair, replacement, and/or cleaning of the water distribution system lid 128. In another embodiment (not shown), the water supply channel is a hose or tubing that includes at least one inlet hole and at least one outlet hole. For example, the water supply channel 148 may be coupled to affixed to the lower surface 136 of the water distribution system lid 128, and may include a plurality of outlet holes each being configured to align with a corresponding one of the plurality of outlet holes 138 of the water distribution system lid 128 when the distribution assembly 124 is assembled. In this configuration, the water supply channel 148 may be tubing composed of a flexible and resilient material, such as rubber, silicone rubber, flexible plastic, or the like. In either embodiment, the distribution assembly 124 optionally further includes an inlet conduit 150 that is in fluid communication with the water supply channel 148.

In one embodiment, the upper surface 134 of the water distribution system lid 128 defines a dome, hump, or other raised area 152 at each of the plurality of outlet holes 138. In one embodiment, the upper surface 134 of the water distribution system lid 128 further defines a plurality of non-pressurized gravity distribution water channels 132 that are symmetrically or asymmetrically radially arranged around the base or border of each raised area 152, and extend to an inner edge 144 and an outer edge 142 of the water distribution system lid 128 that are proximate the raised area 152 from which they extend. Additionally or alternatively, the non-pressurized gravity distribution water channels 132 extend over the raised areas 152 from a location proximate or immediately proximate each outlet hole 138 (for example, as shown in FIGS. 15 and 16). The water distribution system lid 128 further includes a cap 154 at each of the plurality of outlet holes 138 that is sized and configured to fit over at least a portion of the raised area 152, at least over the outlet hole 138. In fact, the outlet holes 138 are obscured in by the caps 154 in FIGS. 9-11, 13, and 15. FIG. 16 shows an outlet hole without a cap 154 for illustration, although it will be understood that a cap 154 may be included when the evaporative cooler 100 is in use. The cap helps evenly distribute and direct water flowing from the outlet hole 138 into the plurality of non-pressurized gravity distribution water channels 132 extending from the raised area 152 surrounding the outlet hole 138. The caps 154 may be removably coupled to the water distribution system lid 128, such as by a hinge and lock, friction fit, clamp, or other suitable mechanical coupling.

As is shown in FIG. 15, the water distribution system lid 128 is located directly adjacent to the evaporative media pad(s) 112. Put another way, the evaporative media pad(s) 112 are located directly subjacent the water distribution system lid 128, without a header, when the evaporative cooler 100 is in use. In one embodiment, the evaporative cooler 100 includes at least four evaporative media pads 112, with one evaporative media pad 112 being directly beneath one of the sides 140 of the water distribution system lid 128. The internal retaining frame 110 and water distribution system lid 128 may be configured such that the water distribution system lid 128 is located a predetermined distance from the upper edge or top of each of the evaporative media pads 112. In one embodiment, the predetermined distance is less than 10 mm.

Referring again to FIG. 9, the supply assembly 126 includes a pump 156 that may be located within the housing 104, such as within the reservoir 108, and at least one hose 158. In one embodiment, the supply assembly 126 includes a first hose 158A and a second hose 158B, each having a first end coupled to an outlet of the pump 156 and a second end coupled to the inlet conduit 150 of the distribution assembly 124. Alternatively, if the distribution assembly 124 does not include an inlet conduit 150, the second end of each hose 158 is instead coupled to an inlet of the pressurized manifold.

During use, the pump 156 intakes water from the reservoir 108, which may surround the aperture, then delivers the water to the hose(s) 158, from where the water flows into the water supply channel 148. From the water supply channel 148, the water flows through the outlet holes 138 in the water distribution system lid 128, and is then evenly distributed into the plurality of non-pressurized gravity distribution water channels 132 extending from the raised areas 152 surrounding the outlet holes 138. Water then flows from the non-pressurized gravity distribution water channels 132 over or through the inner 144 and outer 142 edges of the water distribution system lid 128, and onto the evaporative media pad(s) 112.

Unlike currently known water distribution systems, water is effectively pressurized within the enclosed pressurized water channel(s) 130 of the pressurized water distribution systems 102 disclosed herein. The pump 156 and enclosed pressurized water channel(s) 74 provide momentum pressure to the water, with the outlet holes 138 further metering water flow within the pressurized water supply channel(s) 130 by providing restriction to the water flow. The force created by the pump 156 and pressurization of water within the enclosed pressurized water channel(s) 130, in combination with the restriction of the outlet holes 138, provides the water with a high enough flow rate and/or pressure to ensure even distribution without relying on gravity alone.

When the pressurized water distribution system 102 is assembled, the distribution assembly 124 has a height of approximately 65 mm (±20 mm). This height is less than that of gravity distribution elements of currently known water distribution systems, which are typically approximately 124 mm. Further, when the evaporative cooler 100 is assembled, the evaporative cooler 100 does not include a header block (for example, a header block having a height of approximately 30-mm) or a gap between the distribution assembly 124 and the evaporative media pad(s) 112 (for example, a 20-mm gap, as in currently known evaporative coolers 10). Therefore, the distribution assembly 124 of the pressurized water distribution system 102 disclosed herein may reduce the overall height required to delivery water to the evaporative media pad(s) 112 by approximately 109 mm. This allows for the use of larger evaporative media pads 112 (and, therefore, an increase in the active cooling area of the evaporative media pad(s) 112) and/or an evaporative cooler 100 with smaller dimensions that currently known evaporative coolers 10. Additionally or alternatively, this configuration may also allow for the use of additional or supplemental evaporative media pads 112A.

Figure 10:
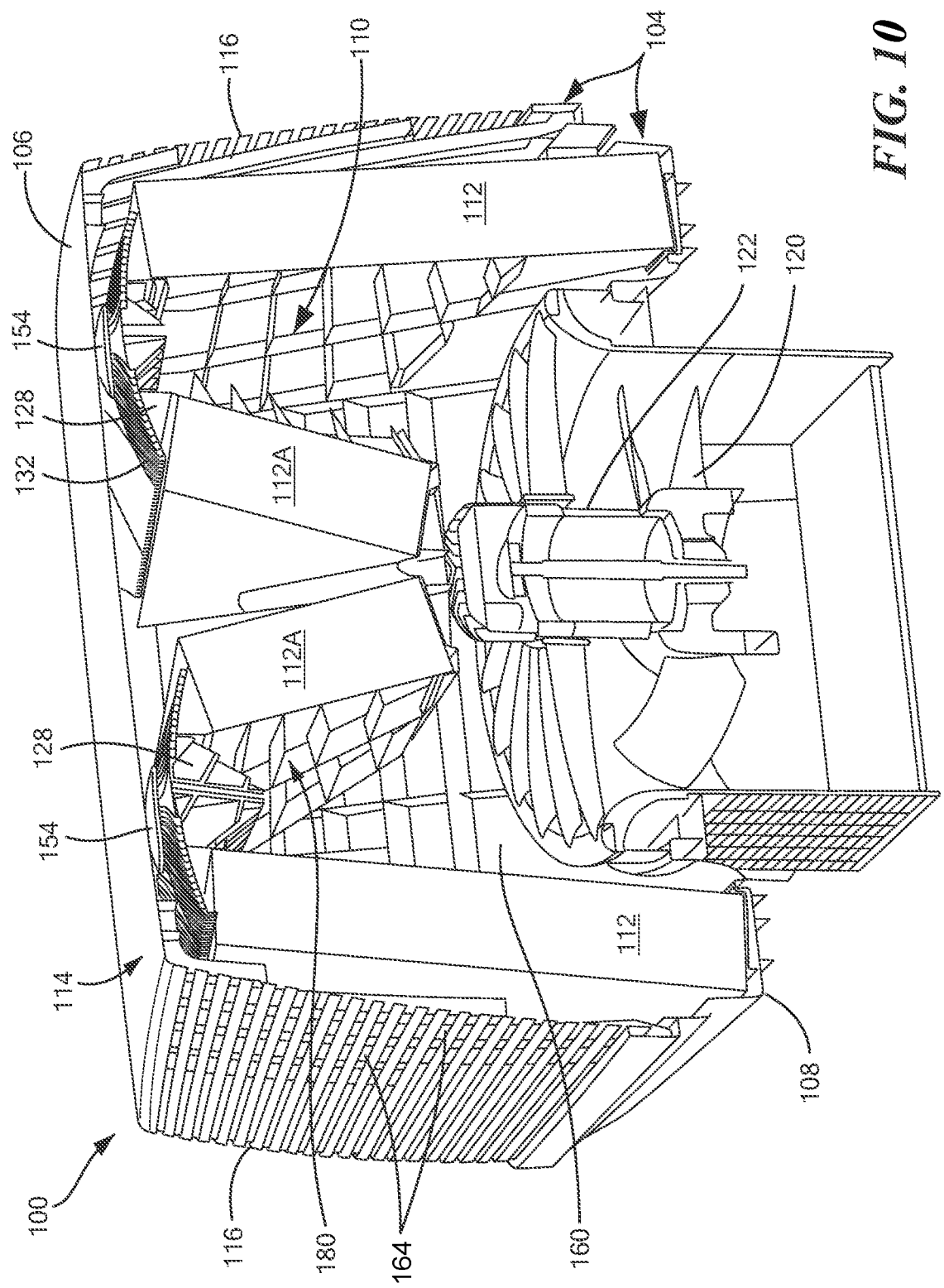
FIG. 10 shows a cross-sectional view of the evaporative cooler of FIG. 9.
Figure 18:
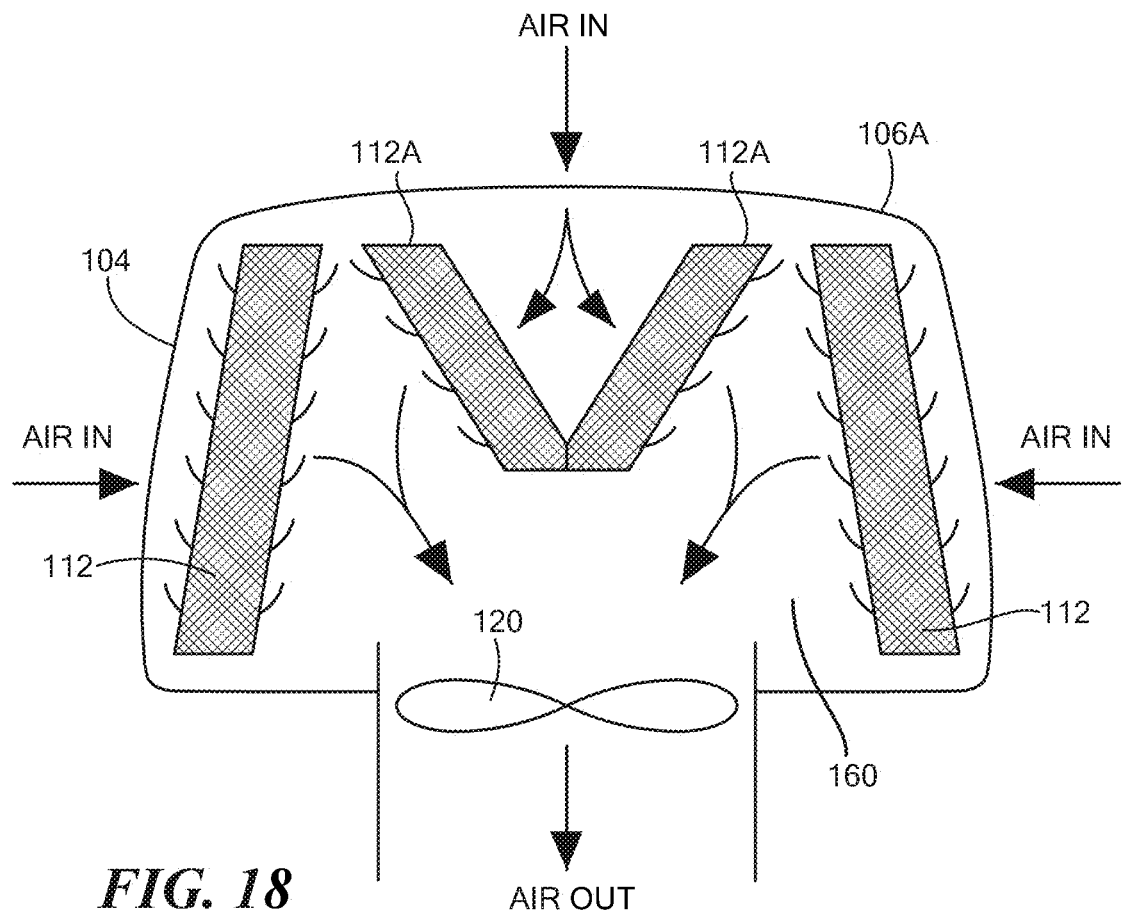
FIG. 18 shows a schematic cross-sectional view of an evaporative cooler having canted supplemental evaporative media pads and a perforated housing lid.

As is most clearly seen in FIGS. 10 and 18, in one embodiment, the evaporative cooler 100 includes supplemental evaporative media pad(s) 112A within a chamber 160 defined by the outer or primary evaporative media pads 112. Unless specifically distinguished, the reference number 112 may be used herein to generally refer to both primary and supplemental evaporative media pads for simplicity. The supplemental evaporative media pad(s) 112A are smaller than the primary evaporative media pads 112, and are sized and configured to be located directly above the fan 120. In one embodiment, the internal retaining frame 110 is configured to retain the supplemental evaporative media pad(s) 112A such that they are canted or arranged at an angle relative to the direction of gravitational flow of water from the water distribution system lid 128. The supplemental evaporative media pad(s) 112A may be arranged at the same or different angles as each other relative to the direction of gravitational flow of water from the water distribution system lid 128. In one embodiment, the evaporative cooler 100 includes two supplemental evaporative media pads 112A that are arranged in a "V" shape relative to each other. Further, the internal retaining frame 110 is configured to retain the supplemental evaporative media pads 112A such that they are aligned with and immediately beneath the water distribution system lid 128, and such that water flowing over at least the first inner edge 144A and the second inner edge 144B of the water distribution system lid 128 is distributed onto the supplemental evaporative media pads 112A (for example, as shown in FIG. 10). Likewise, the internal retaining frame 110 may be further configured to retain the primary evaporative media pads 112 in a vertical position and/or in a canted position. In one embodiment, at least one of the primary evaporative media pads 112 is retained at an angle relative to the direction of gravitational flow of water from the water distribution system lid 128 (for example, as shown in FIG. 11).

Figure 17:
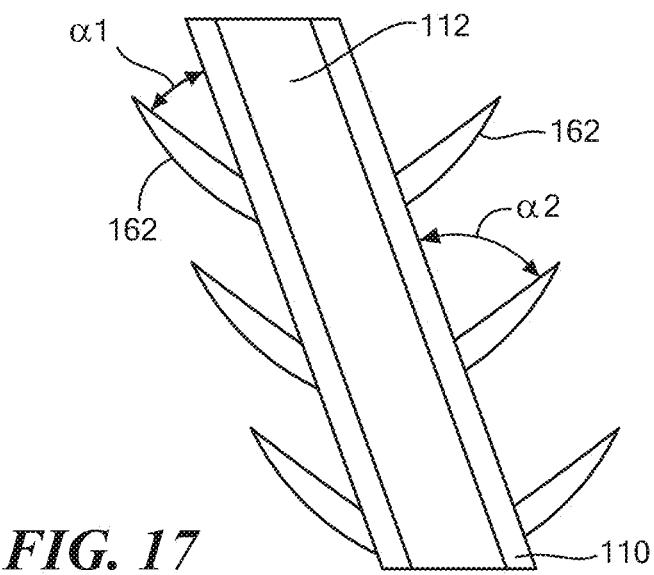
FIG. 17 shows a schematic cross-sectional view of an evaporative media pad retained in a retaining frame with angled louvers.

If the evaporative cooler 100 includes canted evaporative media pad(s) (primary 112 and/or supplemental 112A), there is a risk that the gravity and/or airflow passing over the canted evaporative media pad(s) 112 will pull water downward from the canted evaporative media pad(s) 112, and that the water will travel through the ductwork into the building or structure on which the evaporative cooler 100 is mounted. This may cause damage to the building or structure, and can undesirably increase humidity of the air being delivered to the interior of the building and/or present algae, mold, and mildew problems within the ductwork. To retain water within the evaporative media pad(s) 112, in one embodiment, the internal retaining frame 110 includes angled louvers 162 that are configured to direct water back into the evaporative media pads 112. The internal retaining frame 110 is manufactured such that the angle of the angled louvers 162 is suitable for the mounting angle of the canted evaporative media pad(s) 112. In one non-limiting example, the internal retaining frame 110 may be configured to retain an evaporative media pad 112 at an angle of 65° relative to horizontal, and each angled louver 162 extending from the downward-facing surface of the evaporative media pad 112 may have an angle $\alpha_1$ of approximately 45° (±2°) relative to the downward-facing surface of the evaporative media pad 112, and each angled louver 162 extending from the upward-facing surface of the evaporative media pad 112 may have an angle $\alpha_2$ of approximately 60° (±2°) relative to the upward-facing surface of the evaporative media pad 112 (as shown in FIG. 17). If gravity and/or airflow passing over the evaporative media pad 112 pulls water downward from the surface of the evaporative media pad 112, the water will be collected by the angled louvers 162 and, via gravity, will be returned to the evaporative media pad instead of being released downward into the fan and/or ductwork.

Figure 19:
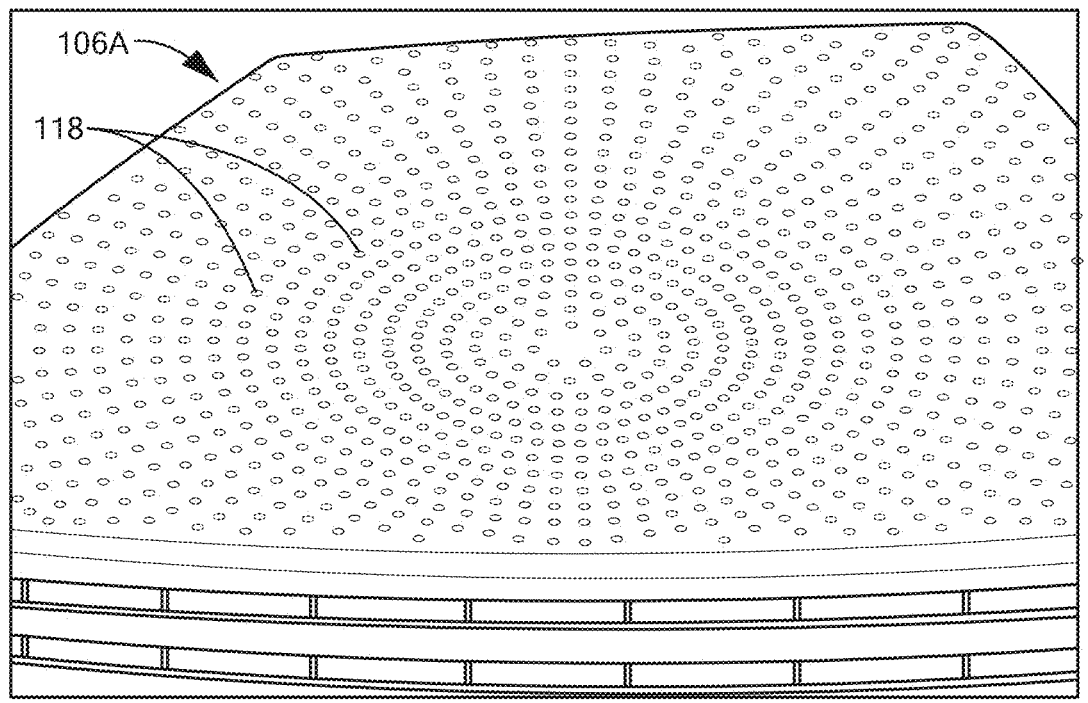
FIG. 19 shows a top view of a perforated housing lid for an evaporative cooler.

Use of supplemental evaporative media pad(s) 112A increases the active cooling area and cooling capacity of the evaporative cooler 100. To maximize exposure of all evaporative media pads 112, and in particular of the supplemental evaporative media pad(s) 112A, in some embodiments, the housing 104 includes a perforated housing lid 106A having a plurality of airflow inlets 118 (for example, as shown in FIG. 19). The side surfaces 116 of the housing 104 also include vents, apertures, holes, inlets, or other airflow inlets or openings 118. As is shown in FIG. 18, rotation of the fan 120 draws air into the housing 104, and in contact with the evaporative media pads 112, through the sides of the housing 104 and through the perforated housing lid 106A. Currently known evaporative coolers 10 are incapable of providing the cooling capacity of the evaporative cooler 100 having a pressurized water distribution system 102, as currently known evaporative coolers 10 have a taller water distribution component that reduces room within the housing 12. As such, the housing cannot accommodate supplemental evaporative media pad(s). Further, currently known water distribution components would block air intake through the lid. Therefore, even if a currently known evaporative cooler 10 included supplemental evaporative media pad(s), cooling capacity would still be limited by the maximum air intake through the sides 14 of the housing 12 only. As the water distribution system lid 128 of the second embodiment of the evaporative cooler 100 includes a center aperture 146, air may flow through both the perforated housing lid 106A and the water distribution system lid 128, in addition to through the side surfaces 116 of the housing 104, and into contact with the primary 112 and supplemental 112A evaporative media pads.

Figure 20:
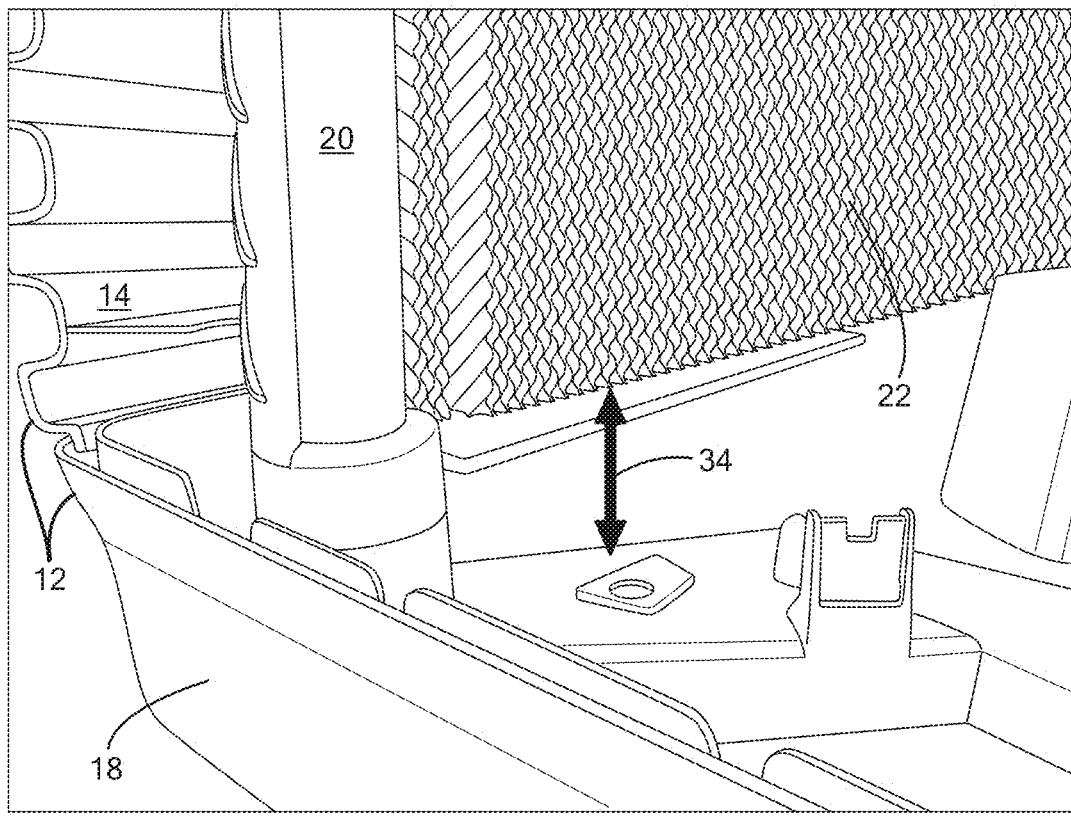
FIG. 20 shows a close-up view of a position of an evaporative media pad mounted to a retaining frame within a currently known evaporative cooler.
Figure 21:
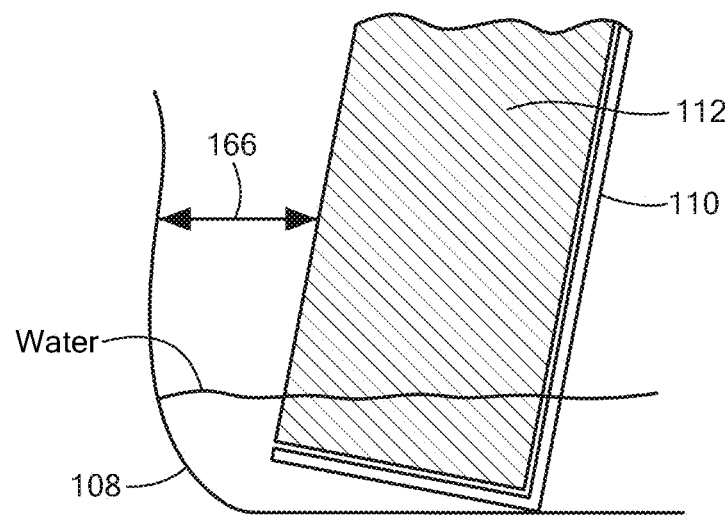
FIG. 21 shows a cross-sectional schematic view of a position of an evaporative media pad within an internal retaining frame for an evaporative cooler of the present disclosure.
Figure 22:
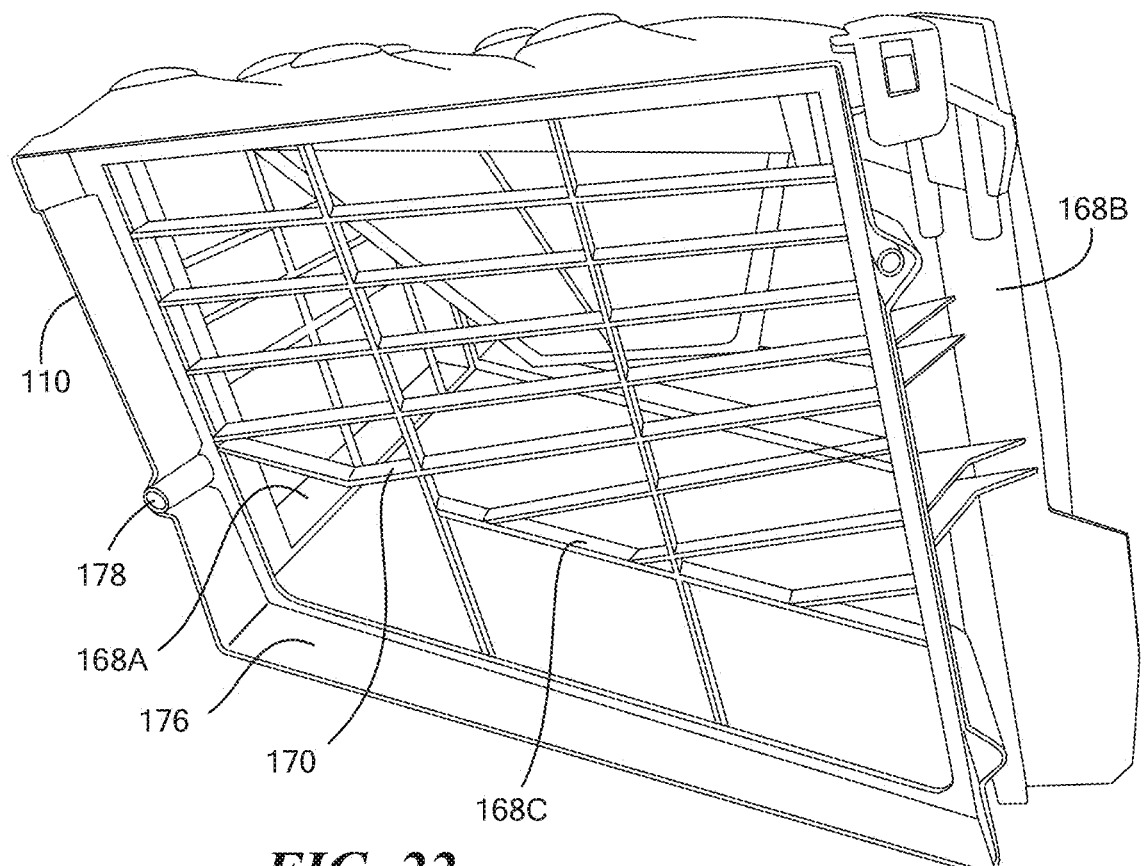
FIG. 22 shows an internal retaining frame for an evaporative cooler of the present disclosure.

Referring now to FIGS. 20-25, an internal retaining frame 110 is shown that maximizes exposure of evaporative media pad(s) 112 to airflow. This internal retaining frame 110 may be used in either the first 50 or second 100 embodiment of evaporative cooler shown and described herein. Further, the internal retaining frame 110 optionally may include angled louvers 162 as shown in FIGS. 10, 11, and 17. In addition to the limitations discussed above, exposure of evaporative media pad to airflow is further limited in currently known evaporative coolers 10 by the way in which evaporative media pad are attached within the housing 12. For example, as shown in FIG. 20, evaporative media pads 22 in currently known evaporative coolers 10 are attached directly to an inner surface of the housing 12 (or, put another way, the retaining frame 20 defines the sides 14 of the housing 12). As a result of this configuration, the evaporative media pads 22 do not extend below the sides 14 of the housing 12 down into the reservoir 18, where the evaporative media pads 22 would be in contact with water within the reservoir 18. Additionally, even if a portion of the evaporative media pads 22 did extend below the sides of the housing, the lack of airflow holes in the reservoir 18 of the housing 12 means that such a portion would not be exposed to airflow, since the evaporative media pads 22 are attached directly to the housing 12. Thus, this gap 34 between the bottom of the evaporative media pads 22 and the bottom of the reservoir 18 represents wasted space that produces no cooling effect.

In contrast, the internal retaining frame 110 of the present disclosure is configured to not only allow the evaporative media pad(s) 112 to extend to the bottom of the reservoir 108, but also to expose the evaporative media pad(s) 112 to airflow. In particular, the internal retaining frame 110 is configured to position the evaporative media pad(s) 112 a distance from the inner surface of the sides 14 of the housing 104 such that the evaporative media pad(s) 112 are not only not directly coupled to the inner surface of the housing 104, but there is also a gap 166 between the inner surface of the side surfaces 116 of the housing 104 and the evaporative media pad(s) 112 through which air may circulate. In one embodiment, the gap 166 is approximately 30 mm. Additionally, the water surrounding a portion of the evaporative media pad(s) 112 creates a seal to prevent air bypass around the bottom of the evaporative media pad(s) 112 instead of through the evaporative media pad(s) 112, which would reduce evaporation of water within the evaporative media pad(s) 112 and, therefore, cooling capacity.

The internal retaining frame 110 is sized and configured to fit within the housing 104. In one embodiment, the internal retaining frame 110 includes four sides 168 that form a box configuration, each side 168 having a plurality of inner louvers 170, which may be angled. A first (or rear) side 168A of the internal retaining frame 110 and a second (or front) side 168B opposite the first side 168A of the internal retaining frame 110 each include a removable retaining frame component 172 for retaining the evaporative media pad(s) 112. The removable retaining frame components 172 include outer louvers 174, which may be angled. A third side 168C extending between the first 168A and second 168B sides and a fourth side 168D opposite the third side 168C and extending between the first 168A and second 168B sides each includes a border region 176. The border region 176 of each of the third 168C and fourth 168D sides includes one or more clips 178 or other components for retaining an evaporative media pad(s) 112 within the border region 176 and in contact with the inner louvers 170.

Figure 23:
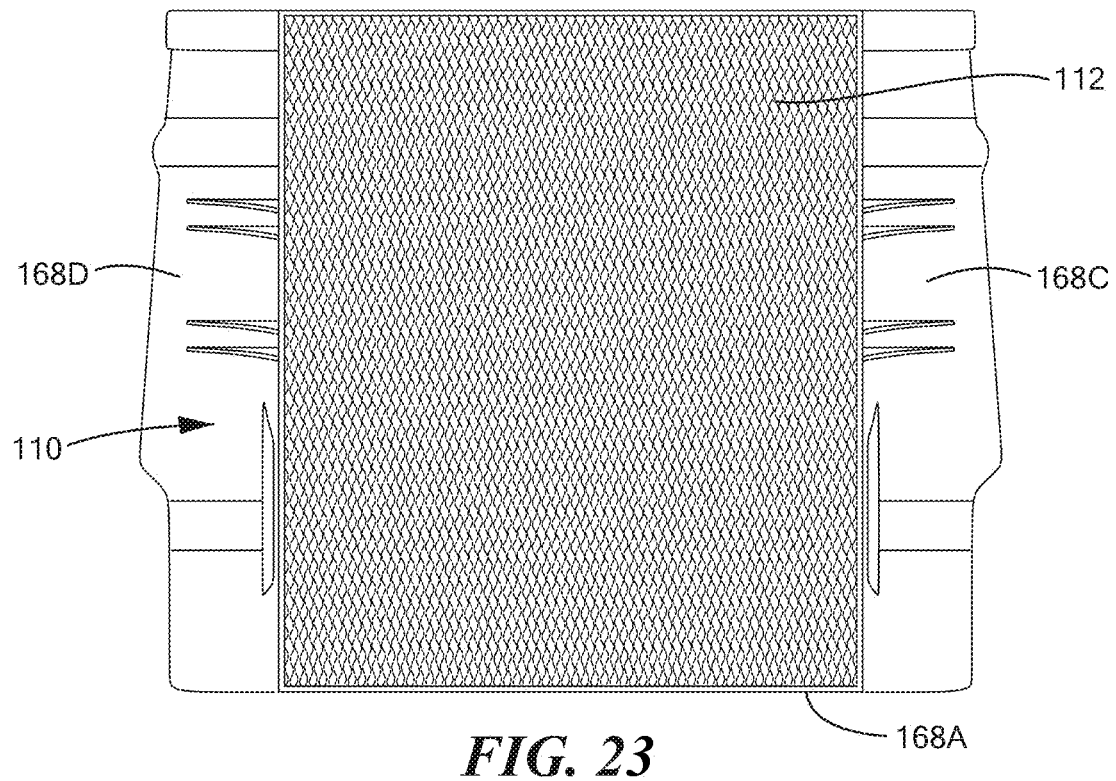
FIG. 23 shows an evaporative media pad partially retained within the internal retaining frame of FIG. 21.
Figure 24:
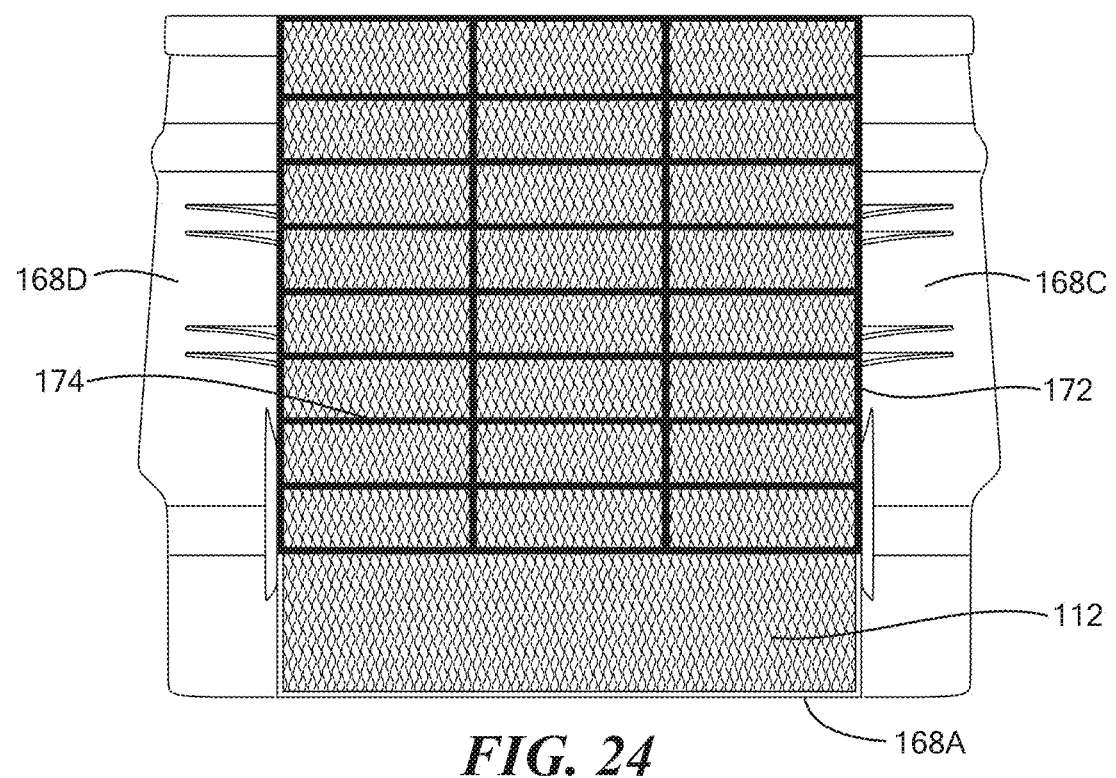
FIG. 24 shows an evaporative media pad fully retained within the internal retaining frame of FIG. 21.
Figure 25:
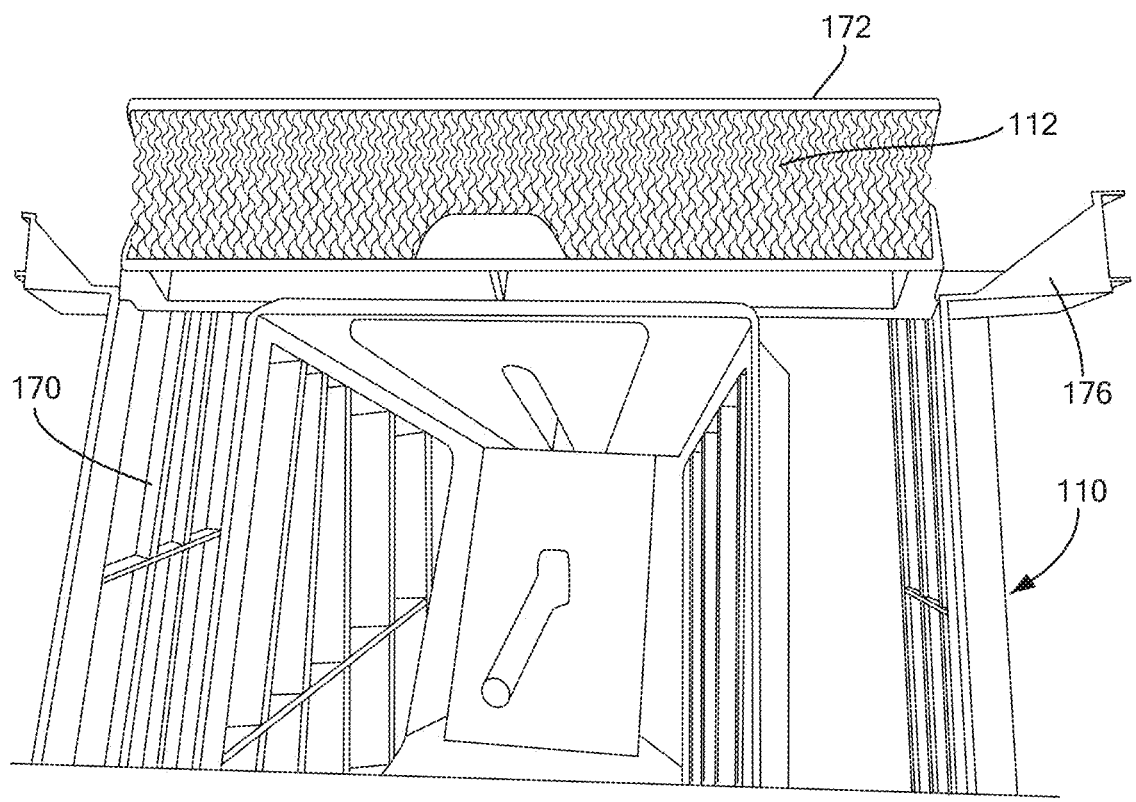
FIG. 25 shows a top view of an evaporative media pad fully retained within the internal retaining frame of FIG. 21.

FIGS. 23-25 illustrate an exemplary method of installing an evaporative media pad 112 to the first 168A and second 168B sides of the internal retaining frame 110. An evaporative media pad 112 may be placed on each of the first 168A and second 168B side of the internal retaining frame 110, with a first side of the evaporative media pad 112 being in contact with the inner louvers 170. Removable retaining frame components 172 are then positioned so that the outer louvers 174 are in contact with the second side of each the evaporative media pad 112, thereby sandwiching the evaporative media pads 112 between each of the first 168A and second 168B sides of the internal retaining frame 110 and the removable retaining frame components 172. The removable retaining frame components 172 are configured to be removably attachable to the first 168A and second 168B sides of the internal retaining frame 110, such as by one or more clips, clamps, hinges, or other suitable mechanical couplings, thereby securing the evaporative media pad 112 within the internal retaining frame 110. An evaporative media pad 112 is then be positioned within the border region of each of the third 168C and fourth 168D sides of the internal retaining frame 110, where the evaporative media pads 112 are secured by the clips 178 within the border regions 176. Additionally, if supplemental evaporative media pad(s) 112A are used, the internal retaining frame 110 also includes a central structure 180 for retaining the supplemental evaporative media pads 112A (for example, as shown in FIGS. 10 and 18).

Figure 26:
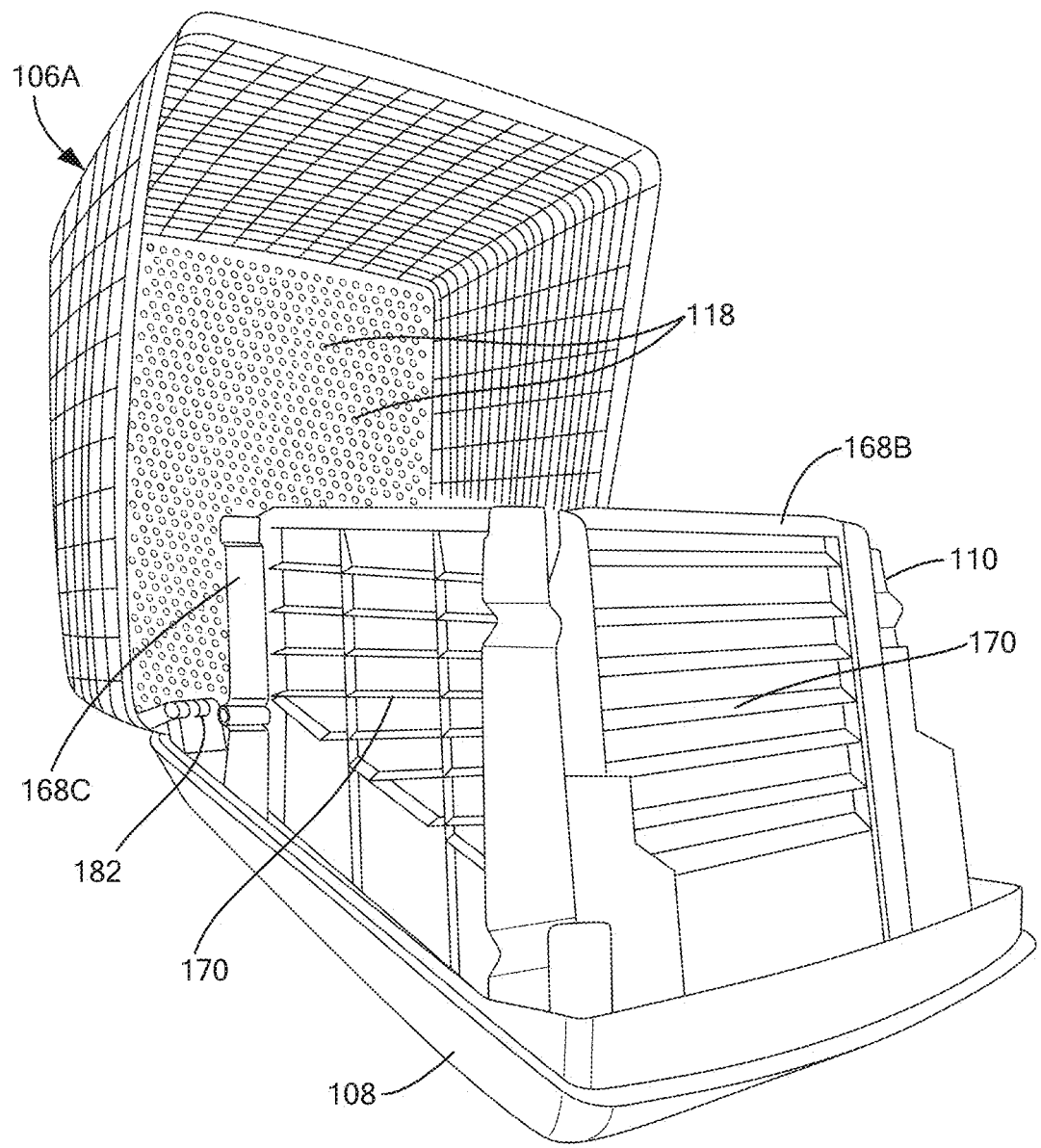
FIG. 26 shows the internal retaining frame of FIG. 21 within an evaporative cooler housing having a single-piece lid and the internal retaining frame of FIG. 21.

Thus, the evaporative media pad(s) 112 are securely positioned within the housing 104, but are not directly coupled to the housing 104. Consequently, a single-piece (unitary) housing lid 106 may be used, as shown in FIG. 26. In one embodiment, the single-piece housing lid 106 defines the top surface 114 and four side surfaces 116 of the housing 104 and is coupled to the reservoir 108 by one or more hinges, snaps, clamps, or other suitable connecting elements 182. Manufacture and assembly of a housing 104 with the single-piece housing lid 106 is less complex (for example, because a single-piece housing lid 106 does not require an evaporative pad retaining frame sub-assembly), reduces the number of housing components required, reduces weight and cost, and may provide aesthetic advantages over housings of currently known evaporative coolers 10. Further, the single-piece housing lid 106 may be perforated (may include a plurality of airflow inlets 118) to allow airflow downward through the housing lid, as discussed above.

As discussed above, advantageous features of the present disclosure, such as a pressurized water distribution system, internal retaining frame, perforated lid, and other features discussed herein, allows for an evaporative cooler having smaller dimensions, increased cooling capacity, and a more attractive appearance. To further enhance the aesthetics of the evaporative cooler, and to provide other advantages discussed below, the evaporative cooler may be configured to be mounted close to, and follow the contour of, a roof or other mounting surface.

Figure 27:
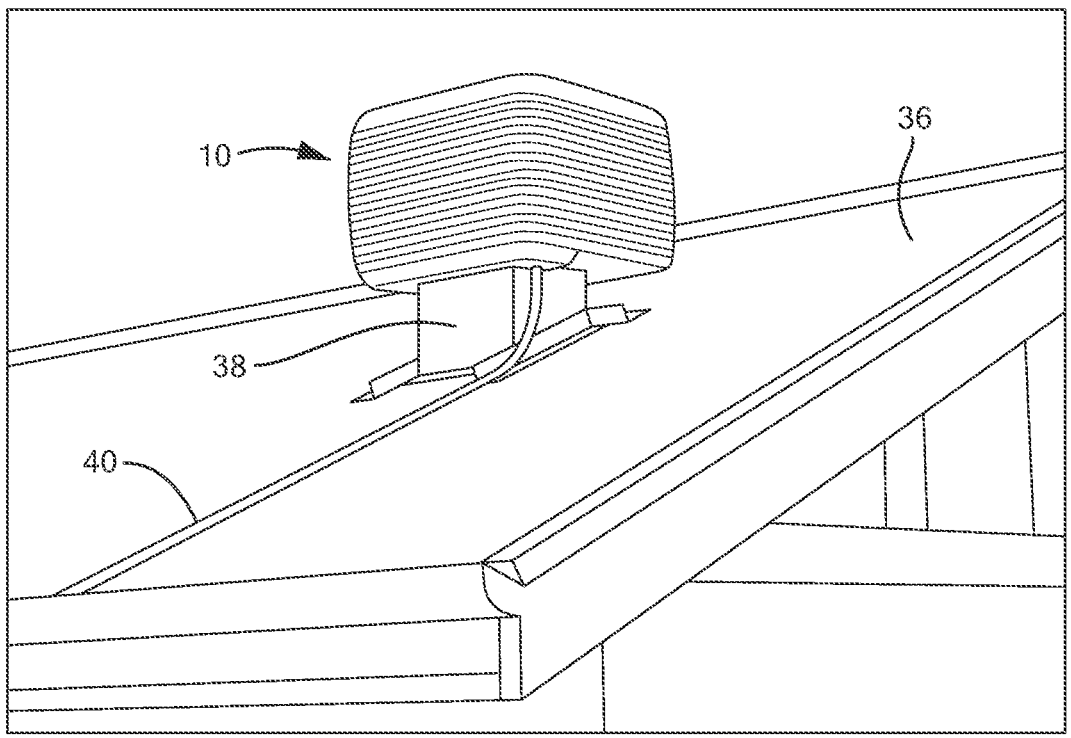
FIG. 27 shows a currently known evaporative cooler mounted on a roof.
Figure 28:
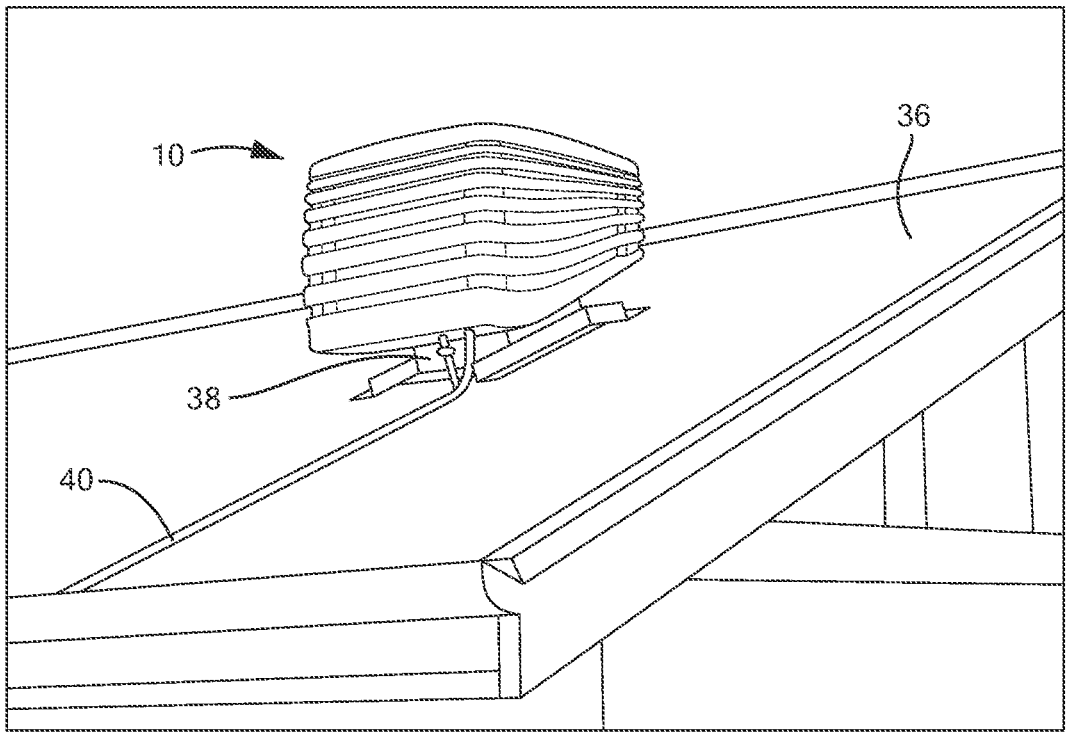
FIG. 28 shows a further currently known evaporative cooler mounted on a roof.

Referring to FIGS. 27 and 28, currently known evaporative coolers 10 are shown mounted to a roof 36. Each of these currently known evaporative coolers 10 is mounted a distance from the roof 36, exposing the roof jack, ductwork, and/or dropper 38. Such mounting is required for currently known evaporative coolers, as the evaporative media pad(s) 22 must be in a vertical position (that is, in a position that is parallel to, or at an angle of 0°) relative to the direction of gravitational flow of water from the gravity distribution element. To achieve even distribution of water onto the evaporative media pad(s) 22, the currently known evaporative cooler 10 must be mounted such that the lid 16 is horizontal. Although some currently known evaporative coolers 10, such as that shown in FIG. 28, include an angled reservoir 18 that comes closer to matching the contour of the roof 36, they still have an angular/boxy appearance and exposed ductwork and/or dropper 38. Additionally, electrical and plumbing conduits 40 to the currently known evaporative coolers 10 run on the outside of the roof 36, which is unattractive and exposes the conduits 40 to weather and damage.

Figure 29:
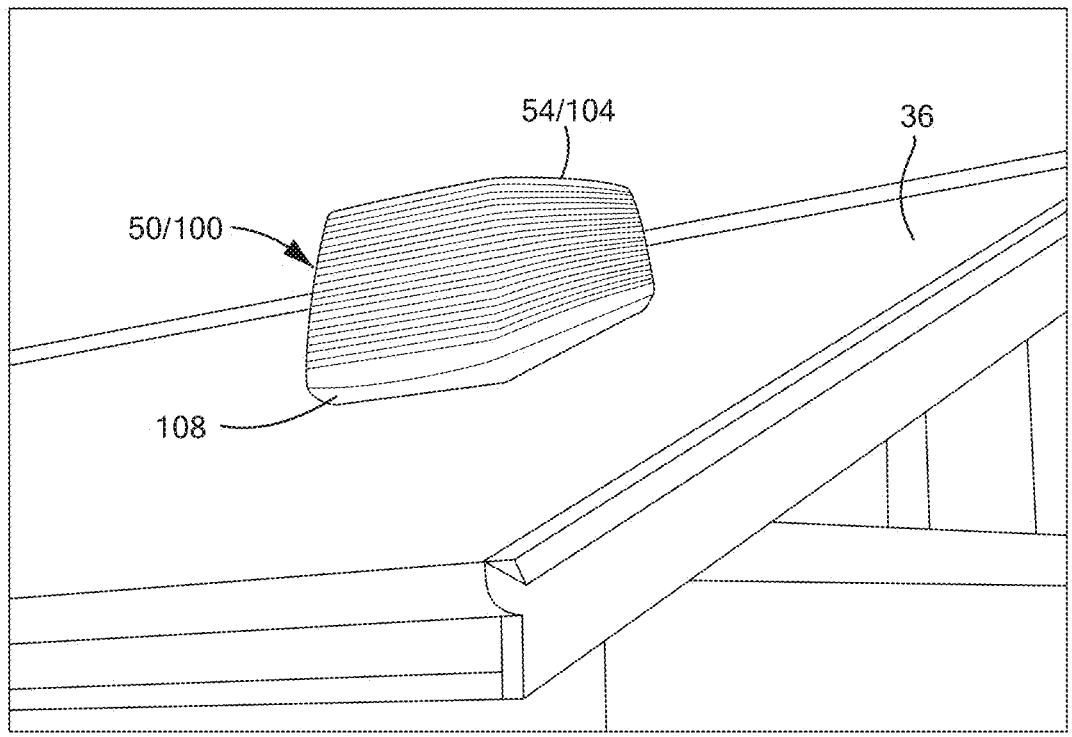
FIG. 29 shows an evaporative cooler of the present disclosure mounted on a roof.
Figure 30:
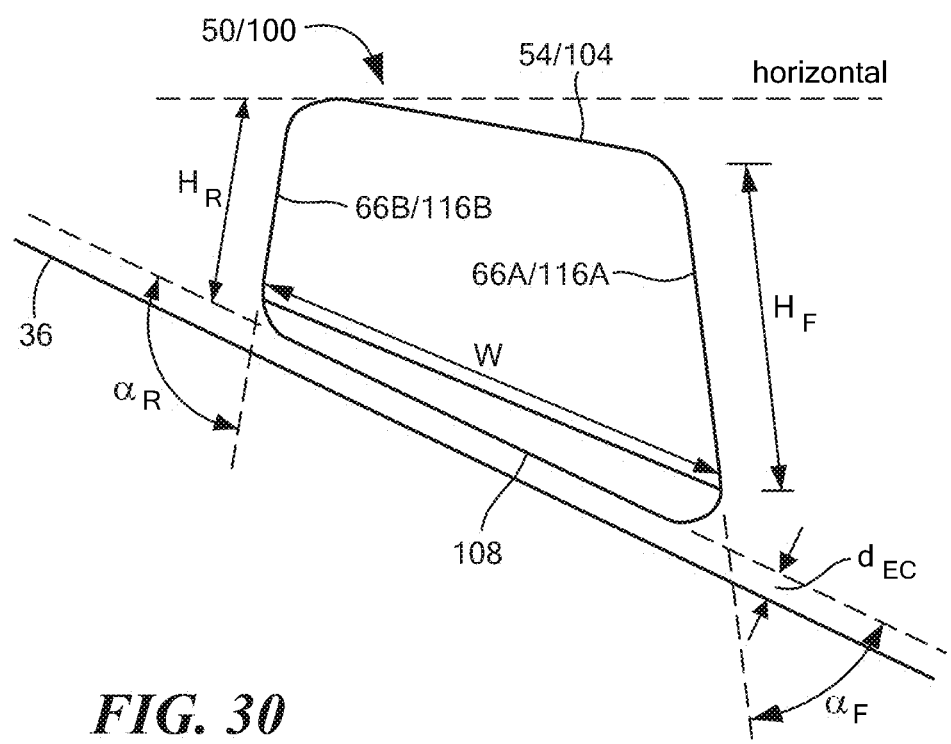
FIG. 30 shows a schematic view of an evaporative cooler of the present disclosure mounted on a roof.
Figure 31:
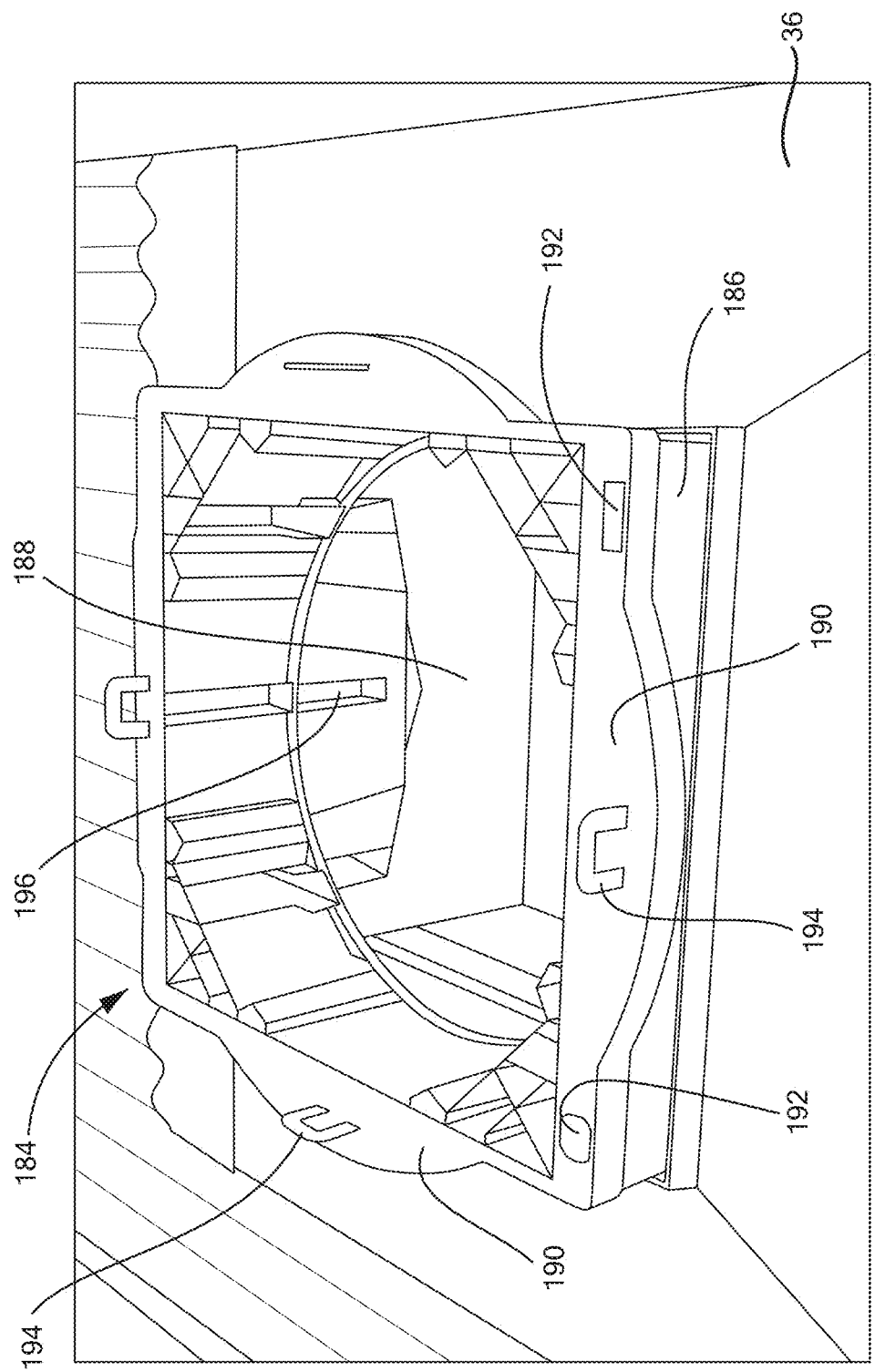
FIG. 31 shows a dropper for an evaporative cooler of the present disclosure.

Referring now to FIGS. 29 and 30, an evaporative cooler 50/100 of the present disclosure is shown that has a low profile and follows the contour of the roof 36 on which it is mounted. As discussed above, use of a pressurized water distribution system 52/102 allows the evaporative cooler 50/100 to be installed at angles of up to between approximately 5° and approximately 45° from horizontal and still allow for even distribution of water over the evaporative media pads 62/112 within. In one embodiment, the evaporative cooler 50/100 is mounted to the roof 36 of a building or structure using a dropper 184 as shown in FIG. 31. The dropper 184 simplifies installation and automatically levels the evaporative cooler 50/100 for even water distribution onto the evaporative media pad(s) 62/112.

In one embodiment, the dropper 184 is configured to position the evaporative cooler 50/100, when mounted to the dropper 184, such that the entire bottom of the evaporative cooler 50/100 (bottom of the reservoir 58/108) is parallel to and separated by a predetermined distance from the planar roof 36 or top surface of the building/structure. In one embodiment, the predetermined distance is approximately 0 mm to approximately 50 mm. For simplicity of illustration, the evaporative cooler 50/100 is referred to herein as being mounted to a roof 36 of a building, regardless of the actual surface and/or structure to which the evaporative cooler is mounted. Further, it will be understood that if the portion of the roof 36 directly beneath the evaporative cooler 50/100 is not a planar surface, the dropper 184 is configured to position the entire bottom of the evaporative cooler 50/100 at a distance of approximately 0 mm to approximately 50 mm from the plane in which the portion of the roof 36 lies.

The predetermined distance between the bottom of the evaporative cooler 50/100 and the roof 36 and/or the mounting angle of the evaporative cooler 50/100 may be determined at least in part by the dimensions and configuration of the housing 54/104. For example, the housing 54/104 may include at least a front height $H_F$, a rear height $H_R$, a bottom width W, an angle $\alpha_R$ between the rear surface 66B/116B and the plane of the roof 36, and an angle $\alpha_F$ between the front surface 66A/116A and the plane of the roof 36 (as shown in FIG. 30). In one non-limiting example, the rear surface 66B/116B of the evaporative cooler housing 54/104 may have a height $H_R$ of approximately 475 mm, the front surface 66A/116A of the evaporative cooler housing 54/104 may have a height $H_F$ of approximately 815 mm, and the bottom surface of the evaporative cooler (the bottom surface of the reservoir 58/108) may have a width W of approximately 1500 mm. Further, the dropper 184 may be further configured to position the evaporative cooler 50/100 such that the entire bottom surface of the evaporative cooler is a distance $d_{EC}$ of approximately 0 mm to approximately 50 mm from the plane of the roof 36 surface, with the rear surface 66B/116B of the evaporative cooler 50/100 lying in a plane that is oriented at an angle $\alpha_R$ of approximately 102° (±5°) from the plane of the roof 36 and the front surface 66A/116A of the evaporative cooler 50/100 lying in a plane that is oriented at an angle $\alpha_F$ of approximately 60° (±5°) from the plane of the roof 36. This low-profile configuration of the mounted evaporative cooler 50/100 may provide a better visual appearance than configurations of mounted currently known evaporative coolers 10. Further, the pressurized water distribution system 52/102 within the evaporative cooler 50/100 will still provide even water distribution to the evaporative media pad(s) 62/112, even when the roof is pitched by an angle of up to approximately 45° form horizontal.

In another embodiment, the dropper 184 is configured to position the evaporative cooler 50/100, when mounted to the dropper 184, such that the bottom surface of the evaporative cooler (the bottom surface of the reservoir 58/108) is a varying distance from the roof 36 (that is, the bottom surface of the evaporative cooler is not parallel to the roof 36), as may be required for roofs having a very steep pitch (such as greater than approximately 45° from horizontal) to maintain even water distribution onto the evaporative media pads 62/112. For example, the bottom surface of the evaporative cooler proximate the rear surface 66B/116B may be approximately 0 mm to approximately 50 mm from the roof 36 surface, whereas the bottom surface of the evaporative cooler proximate the front surface 66A/116A may be approximately 0 mm to approximately 50 mm from the roof 36 surface.

To further enhance the visual appearance of the mounted evaporative cooler 50/100, the reservoir 58/108 of the housing 54/104 is, in some embodiments, darker than the housing lid 56/106 to provide visual separation. Further, the housing 54/104 and/or housing lid 56/106 (for example, if the housing lid 56/106 is a single-piece lid that defines the sides and top of the housing 54/104) may be constructed so that no visible surface is parallel to the roof 36 and/or roof features.

As shown in FIG. 31, the dropper 184 is sized and configured to fit within an opening in the roof 36 and to be attached thereto. The dropper 184 generally includes a neck portion 186 defining an aperture 188, a mounting surface 190 at a first end (an end of the dropper that extends above the roof 36), one or more conduit apertures 192, and one or more mounting elements 194 in, on, or integrated with the mounting surface 190. The neck portion 186 may have a circular, square, rectangular, or other cross-sectional shape. In one embodiment, the neck portion 186 is configured to extend above the roof 36 by approximately 0 mm to approximately 50 mm around an entire circumference or perimeter of the neck portion 186. In another embodiment, the neck portion 186 is configured to extend from the roof 36 by varying distances around the circumference or perimeter of the neck portion 186, to allow the lid 56/106 of the evaporative cooler 50/100, when mounted to the dropper, to be maintained at an angle of between approximately 0° and approximately 45° from horizontal, regardless of the pitch of the roof 36.

The mounting surface 190 may be a flange or flat surface extending outward from (or orthogonal to) the neck portion 186, providing a surface on which the bottom surface of the evaporative cooler housing 54/104 may be supported. The mounting surface 190 includes one or more mounting elements 194 for securely but removably coupling the evaporative cooler 50/100 to the dropper 184 and, thereby, the roof. In one embodiment, the mounting surface 190 includes a plurality of mounting elements 194 that extend upward from the mounting surface 190 (that is, that extend toward the bottom surface of the evaporative cooler housing). Although not shown, the bottom surface and/or the side surfaces of the evaporative cooler housing may include a plurality of corresponding mounting elements that are configured to lockingly engage with the plurality of mounting elements 194 on the mounting surface 190. These engageable mounting elements 194 simplify installation and removal of the evaporative cooler 50/100 by enabling quick and easy coupling and uncoupling of the evaporative cooler 50/100 to the dropper 184.

When installing the evaporative cooler 50/100, the electrical and plumbing conduits may be fed through the conduit apertures 192 in the dropper 184 from within the building or structure to the evaporative cooler 50/100. Passing these conduits through the dropper 184 to the evaporative cooler 50/100 eliminates the need to pass the conduits to the evaporative cooler 50/100 on the surface of the roof 36 and outside the building or structure, which can not only greatly enhance the visual appearance of the mounted evaporative cooler 50/100, but also reduce or prevent damage to the conduits by weather and other hazards. The neck portion 186 further includes a second end opposite the first end, which is configured to be in communication with or coupled to internal ductwork within the building or structure. The neck portion 186 further includes one or more securing points 196 for securing the dropper 184 to the building or structure.

In one embodiment, a pressurized water distribution system for an evaporative cooler comprises: a pressurized flow path portion including at least one pressurized water channel, a plurality of outlet holes, and at least one inlet hole; and a non-pressurized flow path portion including at least one non-pressurized flow path in fluid communication with at least one of the plurality of outlet holes.

In one aspect of the embodiment, the pressurized water distribution system for an evaporative cooler further comprises a plurality of gravity distribution elements, each of the plurality of gravity distribution elements defining the at least one non-pressurized flow path.

In one aspect of the embodiment, each of the plurality of gravity distribution elements includes at least one distribution feature, each of the at least one distribution feature being configured to progressively divide an amount of water flowing therethrough into an increasing number of non-pressurized flow paths.

In one aspect of the embodiment, each of the plurality of gravity distribution elements is configured to be directly adjacent to a corresponding one of a plurality of evaporative media pads.

In one aspect of the embodiment, the pressurized water distribution system for an evaporative cooler further comprises a water distribution system lid, the water distribution system lid at least partially defining the at least one pressurized water channel, a plurality of outlet holes, and at least one inlet hole.

In one aspect of the embodiment, the pressurized water distribution system for an evaporative cooler further comprises a manifold cover enclosing the at least one pressurized water channel, the manifold cover being removably coupled to the water distribution system lid.

In one aspect of the embodiment, the water distribution system lid includes: a first edge; a second edge opposite the first edge; a third edge between the first and second edges;

a fourth edge opposite the third edge and between the first and second edges, and the water distribution system lid defines a plurality of outlet holes proximate each of the first, second, third, and fourth edges. In one aspect of the embodiment, the at least one pressurized water channel includes a first pressurized water channel and a second pressurized water channel. In one aspect of the embodiment, the first pressurized water channel is in fluid communication with the plurality of outlet holes proximate the first edge, a first half of the plurality of outlet holes proximate the third edge, and a first half of plurality of outlet holes proximate the fourth edge; and the second pressurized water channel is in fluid communication with the plurality of outlet holes proximate the second edge, a second half of the plurality of outlet holes proximate the third edge, and a second half of the plurality of outlet holes of the fourth edge.

In one aspect of the embodiment, the at least one pressurized water channel includes a plurality of pressurized water channels, each of the plurality of pressurized water channels being in fluid communication with a corresponding one of the plurality of outlet holes, the water distribution system lid defining a plurality of non-pressurized gravity distribution water channels. In one aspect of the embodiment, the plurality of non-pressurized gravity distribution water channels includes a plurality of water distribution channels extending from and being in fluid communication with a corresponding one of the plurality of outlet holes. In one aspect of the embodiment, the water distribution system lid further includes a plurality of raised area, each of the plurality of raised areas surrounding a corresponding one of the plurality of outlet holes. In one aspect of the embodiment, the water distribution system lid further includes a plurality of caps, each of the plurality of caps configured to at least partially cover a corresponding raised area and being configured to direct a flow of water flowing through the corresponding one of the plurality of outlet holes.

In one aspect of the embodiment, the water distribution system lid defines a center aperture. In one aspect of the embodiment, the water distribution system lid includes a first side, a second side opposite the first side, a third side between the first and second sides, and a fourth side opposite the third side and between the first and second sides, the first, second, third, and fourth sides surrounding the center aperture. In one aspect of the embodiment, each of the first and second sides include a first plurality of outlet holes; and each of the third and fourth sides includes a second plurality of outlet holes, the second plurality being less than the first plurality. In one aspect of the embodiment, each of the first, second, third, and fourth sides is configured to be directly adjacent to a corresponding one of a plurality of evaporative media pads.

In one embodiment, an evaporative cooler comprises: a pressurized water distribution system including: a water distribution system lid including a first pressurized water channel and a second pressurized water channel, each of the first and second pressurized water channels having a plurality of outlet holes and at least one inlet hole; a first manifold cover configured to enclose the first pressurized water channel and a second manifold cover configured to enclose the second pressurized water channel with the plurality of outlet holes and the at least one inlet hole of each of the first and second pressurized water channels remaining unobstructed; and a plurality of gravity distribution elements, each of the plurality of gravity distribution elements defining a plurality of non-pressurized flow paths that are in fluid communication with the first and second pressurized channels, each of the gravity distribution elements including a plurality of distribution features that are configured to progressively divide an amount of water flowing therethrough into an increasing number of non-pressurized flow paths. In this embodiment the evaporative cooler further comprises: a plurality of evaporative media pads, each of the plurality of evaporative media pads being directly adjacent to a corresponding one of the plurality of gravity distribution elements; and a pump including a first outlet in fluid communication with the first pressurized water channel and a second outlet in fluid communication with the second pressurized water channel.

In one embodiment, an evaporative cooler comprises: a pressurized water distribution system including a water distribution system lid including a center aperture, a plurality of outlet holes around the center aperture, a plurality of pressurized water channels in fluid communication with the plurality of outlet holes, and at least one inlet hole in fluid communication with the plurality of pressurized water channels, each of the plurality of outlet holes including a raised area and a cap, the cap being removably coupled to the water distribution system lid, each of the raised areas defining a plurality of non-pressurized gravity distribution water channels in fluid communication with a corresponding one of the plurality of outlet holes; and a plurality of evaporative media pads, each of the plurality of evaporative media pads being directly adjacent to the water distribution system lid and in fluid communication with a corresponding one of the plurality of non-pressurized gravity distribution water channels.

In one aspect of the embodiment, the water distribution system lid includes a first side, a second side opposite the first side, a third side between the first and second sides, and a fourth side opposite the third side and between the first and second sides, the first, second, third, and fourth sides together defining the center aperture, each of the first and second sides including a first plurality of outlet holes and each of the third and fourth sides including a second plurality of outlet holes that is less than the first plurality.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A pressurized water distribution system for an evaporative cooler, the pressurized water distribution system comprising:
a pressurized flow path portion including at least one enclosed pressurized water channel, each of the at least one enclosed pressurized water channels having a plurality of outlet holes and at least one inlet hole;
a non-pressurized flow path portion including a plurality of non-pressurized flow paths, each of the plurality of non-pressurized flow paths being in fluid communication with a corresponding one of the plurality of outlet holes of the at least one enclosed pressurized water channel; and
a water distribution system lid, the water distribution system lid at least partially defining the at least one enclosed pressurized water channel, the plurality of outlet holes, and the at least one inlet hole, the at least one enclosed pressurized water channel extending around a perimeter of the water distribution system lid and the plurality of outlet holes being distributed around the perimeter of the water distribution system lid.

2. The pressurized water distribution system for an evaporative cooler of claim 1, wherein the at least one non-pressurized flow path includes a plurality of non-pressurized flow paths, each of the plurality of non-pressurized flow paths including a gravity distribution element.

3. The pressurized water distribution system for an evaporative cooler of claim 2, wherein each of the plurality of gravity distribution elements includes at least one distribution feature, each of the at least one distribution feature being configured to progressively divide an amount of water flowing therethrough into an increasing number of non-pressurized flow paths.

4. The pressurized water distribution system for an evaporative cooler of claim 2, wherein each of the plurality of gravity distribution elements is configured to be directly adjacent to a corresponding one of a plurality of evaporative media pads.

5. The pressurized water distribution system for an evaporative cooler of claim 1, further comprising a manifold cover enclosing the at least one enclosed pressurized water channel, the manifold cover being removably coupled to the water distribution system lid.

6. The pressurized water distribution system for an evaporative cooler of claim 1, wherein the water distribution system lid includes:
a first edge;
a second edge opposite the first edge;
a third edge between the first and second edges; and
a fourth edge opposite the third edge and between the first and second edges,
the perimeter of the water distribution system lid being proximate each of the first, second, third, and fourth edges, the plurality of outlet holes being defined in the perimeter of the water distribution system lid.

7. The pressurized water distribution system for an evaporative cooler of claim 6, wherein the at least one enclosed pressurized water channel includes a first enclosed pressurized water channel and a second enclosed pressurized water channel.

8. The pressurized water distribution system for an evaporative cooler of claim 7, wherein:
the first enclosed pressurized water channel is in fluid communication with the plurality of outlet holes proximate the first edge, a first half of the plurality of outlet holes proximate the third edge, and a first half of the plurality of outlet holes proximate the fourth edge; and
the second enclosed pressurized water channel is in fluid communication with the plurality of outlet holes proximate the second edge, a second half of the plurality of outlet holes proximate the third edge, and a second half of the plurality of outlet holes of the fourth edge.

9. The pressurized water distribution system for an evaporative cooler of claim 1, wherein the at least one enclosed pressurized water channel includes a plurality of enclosed pressurized water channels, each of the plurality of enclosed pressurized water channels being in fluid communication with a corresponding one of the plurality of outlet holes, the water distribution system lid defining a plurality of non-pressurized gravity distribution water channels.

10. The pressurized water distribution system for an evaporative cooler of claim 9, wherein the plurality of non-pressurized gravity distribution water channels includes a plurality of water distribution channels extending from and being in fluid communication with a corresponding one of the plurality of outlet holes.

11. The pressurized water distribution system for an evaporative cooler of claim 10, wherein the water distribution system lid further includes a plurality of raised areas, each of the plurality of raised areas surrounding a corresponding one of the plurality of outlet holes.

12. The pressurized water distribution system for an evaporative cooler of claim 11, wherein the water distribution system lid further includes a plurality of caps, each of the plurality of caps configured to at least partially cover a corresponding raised area and being configured to direct a flow of water flowing through a corresponding one of the plurality of outlet holes.

13. The pressurized water distribution system for an evaporative cooler of claim 1, wherein the water distribution system lid defines a center aperture.

14. The pressurized water distribution system for an evaporative cooler of claim 13, wherein the water distribution system lid includes a first side, a second side opposite the first side, a third side between the first and second sides, and a fourth side opposite the third side and between the first and second sides, the first, second, third, and fourth sides surrounding the center aperture.

15. The pressurized water distribution system for an evaporative cooler of claim 14, wherein:
each of the first and second sides include a first plurality of outlet holes; and
each of the third and fourth sides includes a second plurality of outlet holes, the second plurality being less than the first plurality.

16. The pressurized water distribution system for an evaporative cooler of claim 15, wherein each of the first, second, third, and fourth sides is configured to be directly adjacent to a corresponding one of a plurality of evaporative media pads.

17. An evaporative cooler comprising:
a pressurized water distribution system including:
a water distribution system lid including an elongate first pressurized water channel and an elongate second pressurized water channel, each of the elongate first and second pressurized water channels having a plurality of outlet holes and at least one inlet hole;
a first manifold cover configured to extend along and enclose the elongate first pressurized water channel and a second manifold cover configured to extend along and enclose the elongate second pressurized water channel with the plurality of outlet holes and the at least one inlet hole of each of the first and second pressurized water channels remaining unobstructed; and
a plurality of gravity distribution elements, each of the plurality of gravity distribution elements defining a plurality of non-pressurized flow paths, each of the plurality of gravity distribution elements being in fluid communication with a corresponding one of the plurality of outlet holes of the elongate first and second pressurized channels, each of the gravity distribution elements including a plurality of distribution features that are configured to progressively divide an amount of water flowing therethrough into an increasing number of non-pressurized flow paths;
a plurality of evaporative media pads, each of the plurality of evaporative media pads being directly adjacent to a corresponding one of the plurality of gravity distribution elements; and a pump including a first outlet in fluid communication with the first pressurized water channel and a second outlet in fluid communication with the second pressurized water channel.

18. An evaporative cooler comprising:

a pressurized water distribution system including a water distribution system lid having a center aperture, a plurality of outlet holes around the center aperture, a plurality of enclosed pressurized water channels in fluid communication with the plurality of outlet holes, and at least one water supply channel in fluid communication with the plurality of enclosed pressurized water channels, each of the plurality of enclosed pressurized water channels having a restriction between the at least one water supply channel and a corresponding one of the plurality of outlet holes, each of the plurality of outlet holes including a raised area and a cap, the cap being removably coupled to the water distribution system lid, each of the raised areas defining a plurality of non-pressurized gravity distribution water channels in fluid communication with a corresponding one of the plurality of outlet holes; and a plurality of evaporative media pads, each of the plurality of evaporative media pads being directly subjacent to the water distribution system lid and in fluid communication with a corresponding one of the plurality of non-pressurized gravity distribution water channels.

19. The evaporative cooler of claim 18, wherein the water distribution system lid includes a first side, a second side opposite the first side, a third side between the first and second sides, and a fourth side opposite the third side and between the first and second sides, the first, second, third, and fourth sides together defining the center aperture, each of the first and second sides including a first plurality of outlet holes and each of the third and fourth sides including a second plurality of outlet holes that is less than the first plurality.

* * * * *